(12) United States Patent
Ley et al.

(10) Patent No.: US 11,849,252 B2
(45) Date of Patent: *Dec. 19, 2023

(54) METHOD AND SYSTEM FOR FILMING

(71) Applicant: Holicom Film Limited, London (GB)

(72) Inventors: Stephen Ley, London (GB); Ian Christopher O'Connell, London (GB); Bruce Finn, London (GB)

(73) Assignee: Holicom Film Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,359

(22) Filed: Sep. 13, 2022

(65) Prior Publication Data

US 2023/0076734 A1    Mar. 9, 2023

Related U.S. Application Data

(63) Continuation of application No. 16/934,588, filed on Jul. 21, 2020, now Pat. No. 11,442,339, which is a
(Continued)

(51) Int. Cl.
| | |
|---|---|
| *G03B 15/06* | (2021.01) |
| *G02B 30/56* | (2020.01) |
| *H04N 19/112* | (2014.01) |
| *H04N 19/132* | (2014.01) |
| *H04N 19/137* | (2014.01) |
| *H04N 19/186* | (2014.01) |
| *H04N 19/17* | (2014.01) |
| *H04N 19/20* | (2014.01) |
| *H04N 19/587* | (2014.01) |
| *G03B 15/02* | (2021.01) |

(Continued)

(52) U.S. Cl.
CPC ............. *H04N 7/142* (2013.01); *G02B 30/56* (2020.01); *G03B 15/02* (2013.01); *G03B 15/06* (2013.01); *G03B 15/07* (2013.01); *H04N 5/2224* (2013.01); *H04N 5/272* (2013.01); *H04N 7/144* (2013.01); *H04N 7/15* (2013.01); *H04N 19/112* (2014.11); *H04N 19/132* (2014.11); *H04N 19/137* (2014.11); *H04N 19/17* (2014.11); *H04N 19/186* (2014.11); *H04N 19/20* (2014.11); *H04N 19/587* (2014.11)

(58) Field of Classification Search
CPC .. H04N 19/112; H04N 19/132; H04N 19/137; H04N 19/17; H04N 19/186; H04N 19/20; H04N 19/587; G03B 15/06; G03B 15/02
USPC .......................................................... 352/43
See application file for complete search history.

(56) References Cited

U.S. PATENT DOCUMENTS 10,718,994 B2 *   7/2020  Ley ........................ H04N 19/20

* cited by examiner

*Primary Examiner* — Jerry L Brooks
(74) *Attorney, Agent, or Firm* — Blake M. Bernard; Bradley Arant Boult Cummings

(57) ABSTRACT

This invention concerns a method of filming a subject to be projected as a Pepper's Ghost image. The method may comprise filming a subject under a lighting arrangement having one or more front lights for illuminating a front of a subject and one or more backlights. The lights may be controlled such that the total brightness of the one or more front lights, as measured of the subject, is less than or approximately the same as the total brightness of the one or more backlights, as measured at the subject. The subject may be located directly above one or more floor lights such the subject is illuminated from below by the one or more floor lights.

18 Claims, 19 Drawing Sheets

Related U.S. Application Data continuation of application No. 16/436,992, filed on Jun. 11, 2019, now Pat. No. 10,718,994, which is a continuation of application No. 14/690,639, filed on Apr. 20, 2015, now Pat. No. 10,317,778, which is a continuation of application No. 13/054,384, filed as application No. PCT/GB2009/050849 on Jul. 14, 2009, now Pat. No. 9,033,522.

(60) Provisional application No. 61/080,411, filed on Jul. 14, 2008.

(51) Int. Cl.
*H04N 5/222* (2006.01)
*H04N 5/272* (2006.01)
*H04N 7/15* (2006.01)
*H04N 7/14* (2006.01)
*G03B 15/07* (2021.01)

METHOD AND SYSTEM FOR FILMING

CROSS-REFERENCES TO RELATED APPLICATIONS

This application is a continuation of U.S. patent application Ser. No. 16/934,588 filed Jul. 21, 2020 entitled METHOD AND SYSTEM FOR FILMING, which is a continuation of U.S. patent application Ser. No. 16/436,992 filed Jun. 11, 2019 entitled "METHOD AND SYSTEM FOR FILMING", which is a continuation of U.S. patent application Ser. No. 14/690,639 filed Apr. 20, 2015, entitled "METHOD AND SYSTEM FOR FILMING", now U.S. Pat. No. 10,317,778, which is a continuation application of U.S. application Ser. No. 13/054,384, filed on Mar. 7, 2011, entitled "METHOD AND SYSTEM FOR FILMING," now U.S. Pat. No. 9,033,522, which is a national stage entry of "METHOD AND SYSTEM FOR FILMING," having serial number PCT/GB2009/050849, filed on Jul. 14, 2009, which claims priority to and the benefit of GB Application No. 0910117.1, filing dated 12 Jun. 2009, GB Application No. 0818862.5, filing date 15 Oct. 2008, and U.S. Provisional Application No. 61/080,411, filing date Jul. 14, 2008, the disclosures of which are expressly incorporated by reference herein in their entireties.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to a method and system for filming a subject to be projected as a Pepper's Ghost image and, in particular, but not exclusively, a method of lighting a subject, in particular a person, being filmed for projection as a Pepper's ghost image in a Pepper's Ghost system, for example the Pepper's Ghost system as described in WO2007052005.

Conventionally, the lighting arrangement for filming of a person, particularly for an interview or presentation, is based on the three point lighting method. In such a method, the person being filmed is lit by a key light, which shines directly upon the front of the subject and serves as the principal illuminator, a fill light, which also shines on the front of the subject and balances the key light by illuminating shaded surfaces to reduce chiaroscuro effects and a back light, which illuminates the subject from behind to create a rim of light around the subject that separates the subject from the background. Typically, the key light and fill light are placed at 45 degrees to the line from the camera to the subject (and at 90 degrees to each other), the fill light being approximately half the brightness of the key light. A total brightness of the back light is significantly less that a total brightness of the front lighting provided by the key and fill lights.

It has been found that the use of such lighting arrangements for the filming of subjects to be projected as a Pepper's Ghost image results in a Pepper's Ghost image that looks flat or "cut-out", detracting from an impression of realism created by the Pepper's Ghost image.

Furthermore, to avoid the appearance of a translucent Pepper's Ghost image it is necessary to light the subject of the Pepper's Ghost image very brightly. However, the use of very bright lights to light the subject can result in subtle shadows on the subject that add to the realism of the Pepper's Ghost image being lost.

Traditionally, film lighting has been provided by incandescent lamps such as tungsten lamps. Such lamps can consume significant electrical power and generate excessive heat and as such are not particularly well suited to studio environments, especially in smaller/mobile studio environments.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect of the invention there is provided a method of filming a subject to be projected as a Pepper's Ghost image, the method comprising filming the subject under a lighting arrangement having one of more front lights for illuminating a front of the subject and one or more back lights, wherein the lights are controlled such that the total brightness of the one or more front lights, as measured at the subject, is less than or approximately the same as the total brightness of the one or more back lights, as measured at the subject.

For the purposes of this specification the term "back lights" includes lights to illuminate the rear and/or side of the subject. The term "side lights" is used to refer to lights that illuminate the side of the subject and the term "rear lights" is used for lights used to illuminate the rear of the subject.

It will be understood that the term "front of the subject" refers to the side of the subject facing towards a camera and the term "rear of the subject" refers to the side of the subject facing away from the camera. In most cases, the front of the subject will include the face of the subject as in some embodiments it is important that the subject maintains eye contact with the camera, but the invention is not limited to the front of the subject including the face of the subject.

By increasing the brightness of the back lighting relative to the front lighting, the projected Pepper's Ghost image appears to be more rounded and to have greater depth than images created from filming a subject using conventional three point lighting methods. In particular, a Pepper's Ghost image is created by projecting the image onto a semi-transparent screen, such as a semi-transparent foil, placed at 45 degrees to the projector and an audience's eye line such that the audience perceives the image as a "ghost" in the backdrop behind the screen. However, the semi-transparent screen only reflects a proportion of the light of the projected image, which often results in an image filmed using conventional lighting arrangements appearing darker than the backdrop. The invention overcomes this problem by utilizing the psychological effect that an object will appear brighter if contrasted with something that is less bright. In the invention, by having the front light less bright or of approximately the same brightness than the back light, the edges of the subject will appear disproportionately brighter, which is believed to make the image appear more rounded and to have greater depth. Furthermore, the shadows of the subject are more evident as they are not washed out by a bright front light.

It will be understood that in one embodiment the term "approximately the same brightness" means that the total brightness of the back lights to the total brightness of the front lights is more than 2:3 and more preferably, more than 3:4. That is the total brightness of the back lights can be less than the total brightness of the front lights and still provide advantages over the prior art as long as the brightness of the front lights is less than 150% of the brightness of the back lights. These advantages generally increase as the ratio of the brightness of the front lights to the brightness of the back lights decreases, for example the brightness of the front lights is preferably less than or equal to 120% of the back lights, more preferably less than 110% of the back lights and even more preferably less than or equal to 100% of the back lights.

The total brightness of the one or more front lights may be less than the total brightness of the one or more back lights.

The lighting arrangement may further comprise one or more side lights for illuminating a side of the subject (i.e. one or more lights at approximately 90 degrees to a line between the camera and the subject). The one or more side lights may be for illuminating both sides of the subject. The one or more side lights may illuminate the or each side with a total brightness, as measured at the subject, that is less than the total brightness of the one or more back lights, as measured at the subject. The one or more side lights may illuminate the or each side with a total brightness that is less than the total brightness of the front lights.

The one or more side lights may be controlled to alter in brightness as the subject moves towards and away from the side light. In particular, the one or more side lights may be controlled to reduce the brightness of illumination when the subject moves towards the side light and to increase in brightness as the subject moves away from the side light.

The one or more back lights, one or more front lights and one or more side lights may comprise different lamps for illuminating (predominately) different sections of the subject. That is, the lamps are directed/pointed at different sections of the subject.

In one embodiment, the different sections comprise vertical sections of the subject, for example, when the subject is a person, five vertical sections, hair, head, torso, legs and feet. For practical reasons, such as available equipment and time, it may not be possible to illuminate these sections and another number of vertical sections may be used, for example three vertical sections, head, torso and legs/feet. Furthermore, if the subject is not a person but is another object, such as an animal, or the person is wearing clothes or equipment that result in the hair, head, torso, legs and/or feet being of similar colours, then other sections may be appropriate. In one embodiment, left and right sections may be used. For a subject that is moving, this may require the lights to track the subject across a stage.

The lamps may comprise predominately profile (ellipsoidal) spotlights as these allow the illumination to by tightly controlled. Preferably, approximately 60% of the illumination is provided by profile spotlights.

The one or more front lights may comprise a profile spotlight for illuminating a head of the subject, a profile spotlight for illuminating the torso of the subject and/or a profile spotlight for illuminating legs and feet of the subject. The one or more front lights may further comprise a fill lamp, such as a Fresnel lamp, for illuminating the subject from below. This fill lamp may help to fill deep shadows caused by loose fitting clothes, unbuttoned jackets, etc. The one or more front lights may further comprise a profile spotlight for illuminating the eyes of the subject. This may be used to lift deep-set eyes without over illuminating the front of the subject.

The one or more back lights may comprise a profile spotlight for illuminating a head of the subject, a profile spotlight for illuminating the torso of the subject and/or a profile spotlight for illuminating legs and feet of the subject.

The lighting arrangement may further comprise one or more overhead lights positioned directly above the subject. Such lights can be used to increase the brightness of a subject hair, for example when the subject has dark hair. The overhead lights may comprise a fluorescent lamp, such as those provided by Kino Flo lighting systems; however, advantageously the one or more overhead lights comprise one or more LEDs.

The one or more front, side and back lights may be arranged to illuminate a cuboid volume such that, when the subject moves horizontally within the cuboid volume, a nature of the illumination on the subject remains substantially the same.

In one embodiment, the lights are controlled to match lighting effects for the subject being filmed to lighting effects at a location the Pepper's Ghost image of the subject is projected. The lights may be controlled to create a colour temperature matching the colour temperature of a person/objects at the location the Pepper's Ghost image of the subject is projected. This may be achieved by illuminating the subject with appropriate coloured lights, for example by using appropriate coloured gels with the lights.

It will be understood that other lighting effects for the subject may be provided to match lighting effects at the location the Pepper's Ghost image of the subject is projected. For example, if a highly reflective surface is present at the location of the Pepper's Ghost image that creates a characteristic light pattern, a similar or matching lighting pattern may be generated by the lights illuminating the subject.

This matching of lighting characteristics between the filmed image of the subject and the lighting conditions at the location the Pepper's Ghost is projected increases the realism of the Pepper's Ghost image.

In embodiments where there is a "live" projection of the subject as a Pepper's Ghost image (often coined a "telepresence"), the method may comprise controlling the lights illuminating the subject in response to a changing lighting environment at the location the Pepper's Ghost image is projected. For example, the lighting at the location the Pepper's Ghost image is projected may change as is common in a show, such as a concert or the like, and the method may comprise controlling the lights illuminating the subject in response to changes in the lighting environment at the location the Pepper's Ghost image is projected.

It will be understood that the term "lighting environment" as used herein means illumination at or near the location the Pepper's ghost image is projected that is not due to the projection of the film. For example, lights illuminating a stage on which the Pepper's ghost appears and reflective surfaces that cause light to fall on/near the location the Pepper's ghost is projected.

According to an aspect of the invention there is provided a method of filming a subject to be projected as a Pepper's Ghost image, the method comprising filming the subject under a lighting arrangement having one or more floor lights, wherein the subject is located directly above the one or more floor lights such that the subject is illuminated from below by the one or more floor lights.

A possible advantage of having one or more floor lights to illuminate the subject from below is that areas which would not be illuminated by front, back or side lights may be illuminated. For example, the underside of the subject's shoes or feet may be illuminated by the floor lights. By illuminating areas of the subject which would not be illuminated normally, the projection of the subject for a Pepper's Ghost appears more real. For example, if the subject lifts their feet, the floor lights illuminate the base of the feet so that the base of their feet are captured on the projected film instead of the base of the feet appearing black due to a lack of illumination.

In one embodiment the one or more floor lights comprise a mask to collimate light emitted by the one or more floor lights such that light emitted by the one or more floor lights is not directly incident on a camera used to film the subject.

It will be understood that the term "directly" in regards the transmittance of light from where the light is emitted to where the light is incident means that there is a line of sight from where the light is emitted to where the light is incident.

Inclusion of the floor lights in the Pepper's Ghost projection would be detrimental to the realism of the Pepper's Ghost illusion. The mask may collimate light emitted by the one or more floor lights such that a substantial amount of the light emitted by the one or more floor lights is directed upwardly relative to the one or more floor lights. An advantage of collimating the light emitted by the one of more floor lights in an upright direction is that it may prevent the floor light from being in the angle of vision of the camera on which the subject is filmed for the Pepper's Ghost. For example, the mask may comprise an opaque surface having a frustro conical shape.

In one embodiment, the one or more floor lights comprise a plurality of individual floor lights, wherein each of the individual floor lights comprises a mask to collimate light emitted by each of the individual floor lights such that a substantial amount of the light emitted by each of the individual floor lights is directed upwardly relative to each of the individual floor lights. For example, the mask may comprise an opaque surface having a frustro conical shape.

An aspect of the invention provides a method of filming a subject to be projected as a Pepper's Ghost image, the method comprising filming the subject under a lighting arrangement having one or more lights which comprise one or more LEDs, wherein significant illumination of the subject, as measured at the subject, is provided by the one or more LEDs.

It will be understood that the term "significant illumination of the subject" means the one or more LEDs provide at least 10% of the lighting power incident on the subject, preferably at least 50% of the lighting power and most preferably at least 90% of the lighting power. In one embodiment, all of the lamps of the lighting arrangement are LED lamps and, therefore, 100% of the lighting power is produced by LED lamps.

In some embodiments there is a "live" projection of the subject as a Pepper's Ghost image which is often coined a "telepresence". The term "live" should be understood to take its conventional meaning of being transmitted at the time of the performance. The skilled person will understand that communications links may introduce some delays. Such delays will either be negligible or imperceivable to an audience or a delay of a few second may occur, for example in the case of a satellite relay being used in the communication link.

The embodiment as described includes the use of low power consumption LED "environmentally green" lighting instruments. These low profile instruments are highly efficient and offer a number of advantages over conventional tungsten lighting making them suitable to use in small areas such as a mobile studio. A mobile studio used for creating a telepresence is herein termed a Telepresence Booth. The characteristics of the Telepresence booth are described in more detail in the earlier patent application number GB 0821996.6. Most importantly the lights are required to work in a small space with minimum power consumption, minimal heat emission and most natural daylight looking skin temperature when focused on the film subject.

LED lamps may, for example, be used as flood lamps or as spot lamps to illuminate the subject.

LED lamps consume far less power than incandescent lamps, allowing the lamps to run off battery power, and have a more stable colour shift (i.e. the colour of the light emitted by the LED lamp does not substantially change with changes in brightness). Furthermore, the cool temperature operation of LED lamps negates any need for air conditioning and is less of a fire risk. Accordingly, the method may comprise not providing air conditioning to cool the lighting arrangement.

In some embodiments the filming of a subject to be projected as a Pepper's Ghost image comprises projecting a telepresence, wherein the light output characteristics of the LEDs are controlled substantially in real time. In such a "live" projection of the subject as a Pepper's Ghost image the method may comprise controlling the lights illuminating the subject in response to a changing lighting environment at the location the Pepper's Ghost image is projected. The use of LEDs is advantageous for such a 25 method because LED lamps are capable of being switched faster than conventional incandescent lamps and can be cycled at high frequency. In some embodiments the LEDs can be dimmed using pulse-width-modulation (PWM) or lowering of the forward current of the diodes.

In one embodiment the method of further comprises conditioning the light emitted by the or at least one of the one or more LEDs with at least one hood or baffle fitted to at least one of the one or more LEDs. The hood/baffle may be used to reduce/block the amount of light coming from the side of an LED (i.e. light that has a direction otherwise than toward the intended subject) or otherwise reduce the divergence of the light produced by the LEDs. Preferably, the inside surface of the hood through which the light from the LEDs travel has a high light absorptance.

According to an aspect of the invention there is provided a method of filming a subject to be projected as a Pepper's Ghost image, the method comprising filming the subject under a lighting arrangement having one or more luminaires, wherein the luminaires comprise a light transmitting member having at least one reflective surface, a plurality of LEDs, at least one output surface and a mask for blocking light emitted by the LEDs such that the mask prevents light emitted by the LEDs from reaching the at least one output surface directly, light emitted by the LEDs reaching the at least one output surface by reflection off the at least one reflective surface.

In one embodiment the luminaires are arranged such that light emitted by the LEDs is directed towards the at least one reflective surface. The mask may comprise an opaque surface located on a side of the LEDs to prevent light from reaching the at least one output surface directly.

One possible advantage of using the luminaires is that because emitted light is reflected before exiting the luminaire, the emitted light has a brightness which is approximately uniform over all the angles in which the light exits the luminaire. This helps in illuminating areas of a subject with uniform brightness. For example the luminaires may have a thin cube shape with two large flat surfaces and four small flat surfaces, where the light emitted by the luminaires is directed, at least approximately, perpendicular from one of the large flat surfaces.

Another advantage of using the luminaires is that they may have small dimensions so that they may be used in many locations where larger conventional lights cannot fit. In one embodiment the luminaires have a cubic shape with a thickness of 8 mm (0.3") and may come in 6 basic sizes of 76 mm×76 mm (3"×3"), 76 mm×152 mm (3"×6"), 152 mm×152 mm (6"×6"), 76 mm×305 mm (3"×12"), 152 mm×305 mm (6"×12") and 305 mm×305 mm (12"×12") and can have any other dimensions up to a maximum size of 1,220×2,440 mm (48"×96"). Alternatively shapes may range from circles to complex geometric shapes.

According to an aspect of the invention there is provided a method of filming a subject to be projected as a Pepper's Ghost image, the method comprising filming the subject with a camera to produce a film, wherein a shutter speed of the camera is between $\frac{1}{25}$" and $\frac{1}{120}$" of a second, preferably $\frac{1}{60}$" and $\frac{1}{120}^{th}$ of a second, preferably $\frac{1}{60}^{th}$ and $\frac{1}{100}^{th}$ of a second, and delivering the film to a Pepper's Ghost projection system. This aspect of the invention can readily be combined with other aspects and embodiments of the invention.

It has been found that these shutter speeds sufficiently reduce motion blur without introducing stroboscopic effects, which can occur at higher speeds.

Delivering the film may comprise sending the film immediately to a Pepper's Ghost projection system, for example for a "live" performance, or delivering the film after completion, for example via any data carrier such as an electronic signal or CD-ROM, etc.

According to an aspect of the invention there is provided a film of a subject to be projected as a Pepper's Ghost image produced in accordance with the aforementioned aspects of the invention.

According to an embodiment of the invention there is provided a method of providing a Pepper's Ghost image comprising filming the subject in accordance with previous aspects and embodiments of the invention and projecting the film through a semitransparent screen positioned at an angle, preferably 45 degrees, to the projected film and an audience eyeliner such that film images are visible to the audience superimposed on a backdrop to the screen.

The term "semitransparent" should be understood to take its normal meaning of allowing the passage of some, but not all, incident light (i.e. partially transparent).

The method may comprise projecting the film such that the Pepper's Ghost image of the subject appears the same height as the subject in real-life. In one embodiment, filming comprises arranging a camera and the subject such that the subject extends substantially across the entire height of the image captured by the camera. In particular, the subject from head to toe may extend substantially across the entire height of the image captured by the camera. This advantageously optimizes the pixel count for the subject.

It is desirable to create a "natural" quality light to illuminate the subject (generally a person). As this subject is captured and projected upon a foil to give the illusion of being "real" natural looking light that allows for optimal realistic flesh tone rendition is important. In these restricted spaces the lights identified and there configuration and control produce the desired result. Their colour temperature can be daylight (5500 degrees Kelvin) which produces outstanding results.

Optimally the Telepresence booth may be of a variety of different sizes although it is generally advantageous to make the booth as small as possible whilst achieving the desired subject area and illumination of same for high quality image capture.

If the subject is a person, a size of an unmasked plate shot of the camera (i.e. the size of the rectangular plane captured by the camera at the location of the subject and perpendicular to the eyeline of the camera) is approximately 2 m by 3.6 m. The camera can be masked to reduce the number of pixels used. This can be achieved with various covers, eg purpose made covers (or simply by tape).

According to an aspect of the invention there is provided a lighting control system for controlling a lighting arrangement, the lighting arrangement comprising one or more lamps for illuminating a subject during filming, a film of the subject being for projection as a Pepper's Ghost image, the lighting control system comprising an input device for receiving inputs on characteristics of the subject to be filmed and a controller arranged to determine from the inputs a required configuration for the lamps and send control signals to at least one of the lamps to cause the lamps to adjust to the required configuration.

According to an aspect of the invention there is provided a data carrier having stored thereon instructions that, when executed by a processor, causes the processor to receive inputs on characteristics of a subject to be filmed for projection as a Pepper's Ghost image, determine from the inputs a required configuration for lamps of a lighting arrangement for illuminating the subject during filming and send control signals to at least one of lamps to cause the lamps to adjust to the required configuration.

In this way, the control system can automatically configure the lamps as required by the characteristics of the subject to be filmed, saving time and reducing the need for an expert lighting technician.

The lighting control system may comprise memory having stored therein data on the required configuration for the lamps for different characteristics of the subject and determining the required configuration may be carried out by comparing the inputs of characteristics of the subject to those stored in memory.

The characteristics of the subject may be skin colour, hair colour and colour of the subject's clothes and shoes.

The required configuration may comprise the brightness of the lamps. In one embodiment, in each of the required configurations, the total brightness of one or more front lights, as measured at the subject, may be less than the total brightness of one or more back lights, as measured at the subject.

The required configuration may comprise a colour of the lamps.

The required configuration may comprise a position of the lamps. In particular, a required position of the lamps may be dictated by a height of the subject, such as a height of a subject's legs, torso, head and/or total height.

The inputs may further comprise an input of a stylistic requirement, for example low key lighting or high key lighting, the required configuration being determined from the input of the characteristics of the subject and the stylistic requirement.

According to an aspect of the invention there is provided a lighting 5 control system for controlling a lighting arrangement, the lighting arrangement comprising one or more lamps for illuminating a subject during filming, a film of the subject being for projection as a Pepper's Ghost image, the lighting control system comprising a controller for controlling each of the lamps to change a configuration of the lamps, the 10 controller connected to a data link providing data on a lighting environment at a location where the film of the subject is being projected as a Pepper's Ghost image, the controller sending control signals to each of the lamps to cause the lamps to adjust configuration during filming in response to data on changes in the lighting environment.

According to an aspect of the invention there is provided a data carrier having stored thereon instructions that, when executed by a processor of a lighting control system comprising one of more lights for illuminating a subject during filming, causes the processor to receive data on a lighting environment at a location where a film of the subject is being projected as a Pepper's Ghost image and send control signals to each light to cause the lights to adjust configuration during filming in response to data on changes in the lighting environment.

In this way, the lights are automatically adjusted in response to changes in the lighting environment where a "live" Pepper's Ghost image of the subject is being projected.

The data carrier may be any one of a floppy disc, a CD-ROM/RAM, a 30 DVD ROM/RAM, a Blu Ray disc, an HD DVD ROM, a tape, a hard drive, a memory (including USB memory stick, a memory card, etc.), a signal (including an Internet download, an FTP transfer, etc), a wire or any other suitable medium.

According to an aspect of the invention a method of filming a subject to be projected as a Pepper's Ghost image, the method comprising filming the subject under a lighting arrangement having one of more first lights for illuminating a front of the subject and one or more second lights for illuminating the rear and/or side of the subject, wherein the lights are controlled such that the total brightness of the one or more first lights is less than or approximately the same as the total brightness of the one or more second lights.

A method of filming a subject to be projected as a Pepper's Ghost image, the method comprising filming the subject under a lighting arrangement having one of more front lights for illuminating a front of the subject and one or more back lights for illuminating the rear of the subject, wherein the lights are controlled such that the total brightness of the one or more front lights, as measured at the subject, is less than or approximately the same as the total brightness of the one or more back lights, as measured at the subject, and wherein the principal illumination of the subject by the lights is provided by LEDs.

The method may be carried out in a room less than 6 metres wide and/or less than 20 metres in depth. For studios that are greater than 6 metres wide and 20 metres in depth, conventional tungsten lamps can be used.

The LED lamps may be as described in US2008259600, US2006181862, EP1677143 and US2005259409.

According to an aspect of the invention there is provided a method of filming a subject to be projected as a Pepper's Ghost image, the method comprising filming the subject in front of a back screen under a lighting arrangement having one of more front lights for illuminating a front of the subject, wherein a drop-off distance of the front lights is less than a distance between the front lights and the back screen.

An advantage of using front lights which have a drop-off distance which is less than the distance between the front lights and the back screen is that there will not be undue light incident on the back screen. If there is undue light incident on the back screen, this will make the back screen appear grey and therefore reduce the contrast between the subject and the back screen.

Numerous other objects, advantages and features of the present disclosure will be readily apparent to those of skill in the art upon a review of the following drawings and description of a preferred embodiment. Embodiments of the invention will now be described with reference to the accompanying drawings, in which:

DETAILED DESCRIPTION

Figure 1:
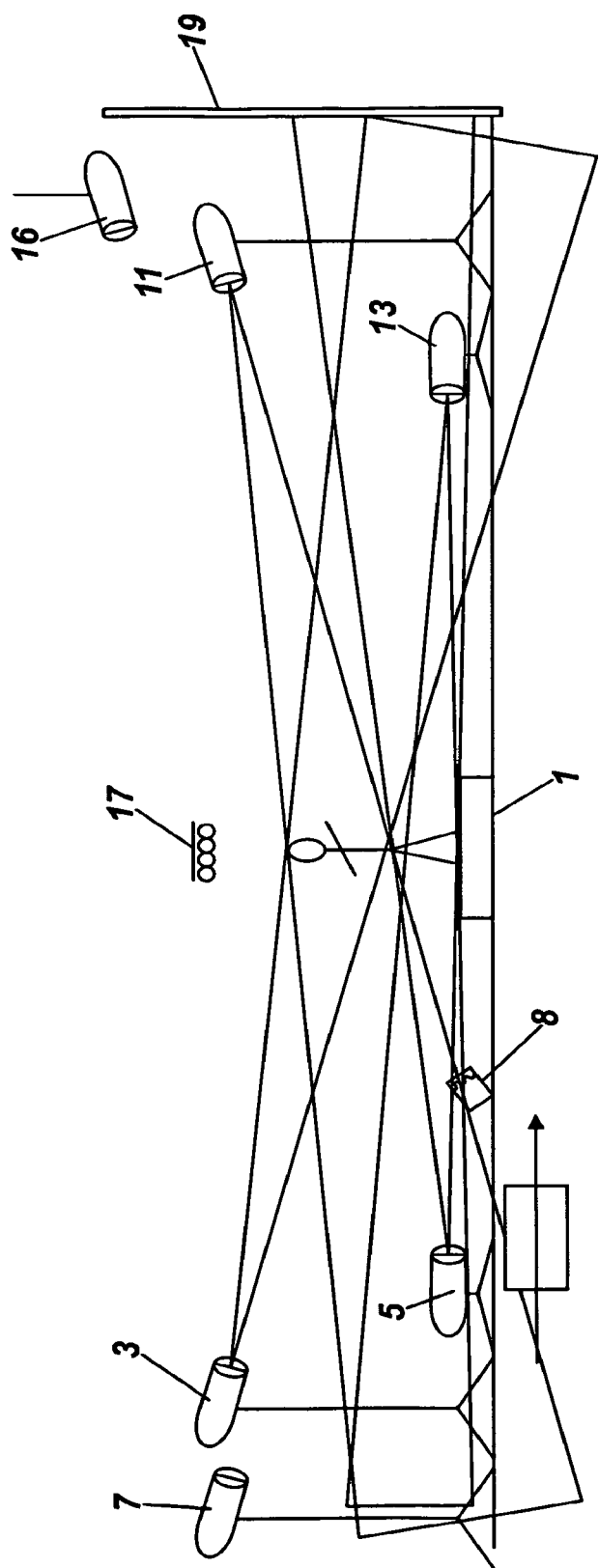
FIG. 1 shows a cross-sectional view of a studio setup for a lighting arrangement in accordance with one embodiment of the invention.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Figure 2:
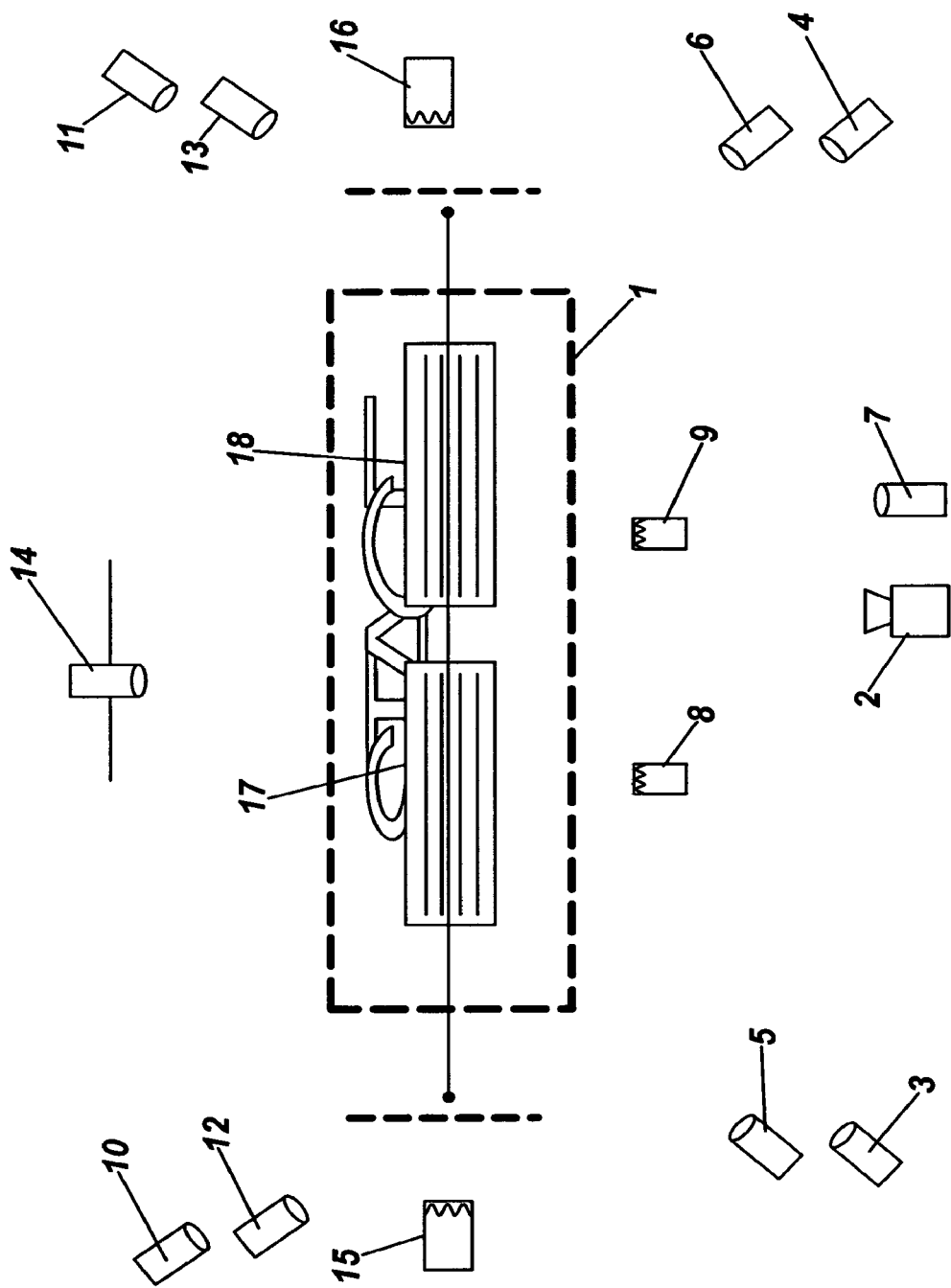
FIG. 2 is a schematic plan view of the studio setup shown in FIG. 1.

Referring to FIGS. 1 and 2, a studio setup comprises a stage 1 on which a subject, such as a person, is to be filmed by camera 2, such as a Sony HDW-750P, Sony HDW-900P or HDC-F950, with a standard lens (e.g. Canon HJ21 or 22) for projection as a Pepper's Ghost image. When being filmed, the person is illuminated by a lighting arrangement comprising front lights 3 to 9 for illuminating a front of the person, rear lights 10 to 14 for illuminating the rear of the person and side lights 15 and 16 for illuminating a side of the person.

The term "front of the person" refers to the side of the person facing towards the camera and the term "rear of the person" refers to the side of 20 the person facing away from the camera.

The following embodiment is described in which some of the lights may be incandescent or fluorescent lamps (e.g. tungsten lamps) but, as will be explained in more detail later, it is advantageous for at least some of the lights to be LED lamps.

The front lights 3 to 9 comprise lights for illuminating different sections of the person. In one embodiment, a pair of high front lights 3 and 4 mounted on stands, for example 14 ft stands, for illuminating the head and torso of the person and a pair of low front lights 5 and 6 for illuminating the legs and feet of the person. The front lights further comprise a high eye light 7 for illuminating the eyes of the person and two floor fill lights 8 and 9 for lifting shadows in clothing of the person.

The front lights 3 to 7 are electronically controllable 2 kW profile (ellipsoidal) spotlights having a 22 to 25 mm lens and whose area of illumination can be tightly controlled as required. In particular, the lights 3 to 7 may have appropriately controlled barn doors for confining the light beam as required and colours and brightness of the spotlights 3 to 7 are selected based on the required colour temperature of that section of the person, such as required skin colour and colour of the clothes covering the upper torso. For example, for a person having very dark skin, the power of the front lights 3 and 4 may be 1.8 kW. For a person having a very light skin colour the power of the front lights 3 and 4 may be 1.3 kW. It will be understood that the front lights 3 and 4 may be set at a suitable power level in between 1.3 kW and 1.8 kW dependent on how light or dark the person's skin colour/clothes. The colour of the eye light 7 may also depend on the skin colour of the person.

The colour and brightness of low front lights 5 and 6 will depend on the 20 colour of the clothes covering the legs and the shoes covering the feet. The power of the low front lights 5 and 6 is also set between 1.3 and 1.8 kW depending on how light/dark are the subject's clothes and shoes.

The floor fill lights 8 and 9 may be 650 W Fresnel lights having a 25 brightness and colour dependent upon the clothes and skin tone of the subject.

The front lights 3 to 7 are angled such that the majority of light emitted by the front lights 3 to 7 is not directly reflected by the back wall 19 back to the subject. In this way, the reflected front light does not appear as undesirable back lighting of the subject.

The back lights 10 to 14 are electronically controllable 2 kW profile (ellipsoidal) spotlights having a 22 to 25 mm lens and comprise lights for illuminating different sections of the person. In this embodiment, a pair of high back lights 10 and 11 mounted on stands, such as 14 ft stands, for illuminating the head and torso of the person and a pair of low back lights 12 and 13 for illuminating the legs and feet of the person. The front lights further comprise a high centre back light 14 for illuminating the head and waist of the person.

LED lights may be used for the front, back and/or side lights. For example, 5600 K (Kelvin) LED lamps may be used. LED lamps consume far less electrical power than incandescent lamps, allowing the lamps to run off battery power or comparatively smaller power supplies. The use of batteries reduces the number of cables in the studio and improves the safety of the working environment. The LEDs also have a more stable colour shift (i.e. the colour of the light emitted by the LED lamp does not substantially change with changes in brightness). Furthermore, the cool temperature operation of LED lamps negates any need for air conditioning and is less of a fire risk.

Since LED lamps run at much lower voltages than incandescent lamps and, generally, for illuminating a subject for filming the voltages will generally be in the range of a few volts to a few tens of volts). Since LED lamps run at relatively low voltage and are solid state components they are better suited to integration with control electronics. This is useful for the current invention in which various technical advantages can be achieved by control of the optical output of the front, side and rear lights. In particular LED lamps are capable of being switched faster than conventional incandescent lamps thereby allowing the lamps to be dimmed rapidly. The intensity of the light produced by LEDs can also be controlled using pulse-width-modulation.

LED lamps, being solid state components, are generally robust and shock resistant (in contrast to fluorescent and incandescent bulbs). This is particularly advantageous in studio environments and more so in portable studio environments in which the lamps are subjected to the rigours of regular transportation. LEDs can have a relatively long useful life with estimates of time to failure in the region of 35,000 to 50,000 hours being reported (compared to about 1,000-2,000 hours for incandescent light bulbs). LEDs have a slow failure, that is, they mostly fail by dimming over time, rather than the abrupt burn-out of incandescent bulbs. All of these properties mean that the number of spare lamps that need to be carried is much lower than would be required for an incandescent bulb lighting system. This an important advantage for mobile studio environments in which space and weight capacity is restricted.

The advantages described above for LEDs can be realised by using LED lamps for some or all of the lamps in the lighting system. So, if say 25% of the lamps where LEDs then there would be a corresponding/concomitant realization of the advantages provided by using LED lamps (such as, for example, reduction in electrical power required for the lighting system etc.). In other words, although the full benefits of using LEDs are realised when substantially all of the lamps used in the lighting system are LED lamps, the same benefits, but to a lesser extent, can be realised when only a portion of the lamps in the lighting system are used in the lighting system.

The brightness and colours of the back lights 10 to 14 will depend on the skin, clothes and shoe colour of the person.

For example, for a person having very dark skin, the power of the back lights 10 and 11 may be set at 1.7 kW. For a person having very light skin, the power of the back lights 10 and 11 may be set at 900 W. The colour of the centre back light 14 may also depend on the skin colour of the person.

The colour and brightness of low back lights 12 and 13 will depend on the colour of the clothes covering the legs and the shoes covering the feet. For dark clothes and shoes, the power of the low back lights 12 and 13 will be higher than when the subject has light clothes and shoes.

The front and back lights 3 to 7 and 10 to 14 are placed approximately 1.5-2 m from the subject.

Sidelights 15 and 16 are profile (ellipsoidal) spotlights for illuminating the side of the person and the brightness and colours of the side lights 15 and 16 will also depend on the skin, clothes and shoe colour of the person.

In one embodiment, the power levels of the side lights 15 and 16 are adjusted in response to movement of the person on the stage. The power level of light 15, 16 is reduced as a person moves towards the light and increased as a person moves away from the light.

The person may also illuminated by overhead fluorescent lights 17 and 18, in this embodiment fluorescent light provided by KinoFlo Lighting Systems, to illuminate the hair of the person These lights 17 and 18 are particularly advantageous when the person has a dark hair colour. As will be described in more detail with respect to FIGS. 5 to 20, advantageously at least some of the overhead lighting 17 may be provided by LED lamps.

The studio is arranged to provide a plain backdrop, in particular, the back wall 19 provides a "blank" backdrop appropriate for the filming of a Pepper's Ghost image, such as a black, blue, green or silver screen.

Such a back wall 19 reduces light reflected back to the subject. If possible, the colours of the subject should be chosen so as not to match the colour of the backdrop. A blue/green screen backdrop is preferred as if a black backdrop is over lit, the clarity of the Pepper's Ghost image produced from the film may be compromised, particularly around the outline where the Pepper's Ghost image can appear fuzzy, rendering the Pepper's Ghost image less realistic.

If providing a blue/green backdrop is not possible, an alternative is to provide a silver screen on back wall 19 and a circle of tightly formed blue LED lights around the camera lens which act to key out the background and isolate the subject in the foreground.

In use, the person is illuminated by the lights 2 to 18 when being filmed 20 by camera 2. A polarizing camera filter may be used to control specular reflections from either the floor of the subject.

The lighting arrangement is configured such that when the recorded film of the person is projected in a system, such as that described in WO2007052005, the Pepper's Ghost image of the person appears more rounded and to have greater depth than images created from filming a person using conventional three point lighting methods. In particular, the lights 3 to 18 are controlled such that the total brightness of the one or more front lights 3 to 9 is less than or approximately the same as the total brightness of the one or more back lights (for example, less than or approximately the same as the total combined brightness of the one or more rear lights 10 to 14 together with the one or more side lights 15 and 16). The total brightness of the front lights 3 to 9 may be less than 150% of the total brightness of the back lights. That is, although the front lights can in some embodiments be brighter than the back lights, the front lights should not be too bright compared to the back lights (eg they should be less than 150% of the brightness of the back lights). The one or more side lights may illuminate the or each side with a total brightness that is less than the total brightness of the one or more rear lights but more than the total brightness of the front lights.

Overall the intention of the lighting is to be bright enough to capture detail in a uniform manner without dark spots (otherwise the dark spots will cause parts of the image to become invisible) or overly bright spots (image bleaching). The lighting should pick out differing textures as well as cast shadow across the subject accentuating form and the passage of light moving across the subject. Rear lighting should form a rim around the subject outline to increase image sharpness.

The colour temperature of the Pepper's Ghost image of the subject should match as closely as possible the hue and colour temperature of similar skin tones of persons performing with the Pepper's Ghost image. The desired colour temperature is achieved through selecting the required colours for the front, back and side lights, for example by colour correcting the lights with gels. It will be understood that in some embodiments such colour temperature matching is not required as the lighting at the location the Pepper's Ghost image is projected could be arranged to light the Pepper's Ghost image separately from any other person in the vicinity of the Pepper's Ghost image.

Other lighting effects at the location the Pepper's ghost image is projected may also enhance the realistic appearance of the image, for example up lighting a backdrop to a stage on which the Pepper's Ghost is projected whilst making sure that none of these lights illuminate the area behind the Pepper's Ghost image as this lighting may overpower the Pepper's Ghost projection.

Figure 3:
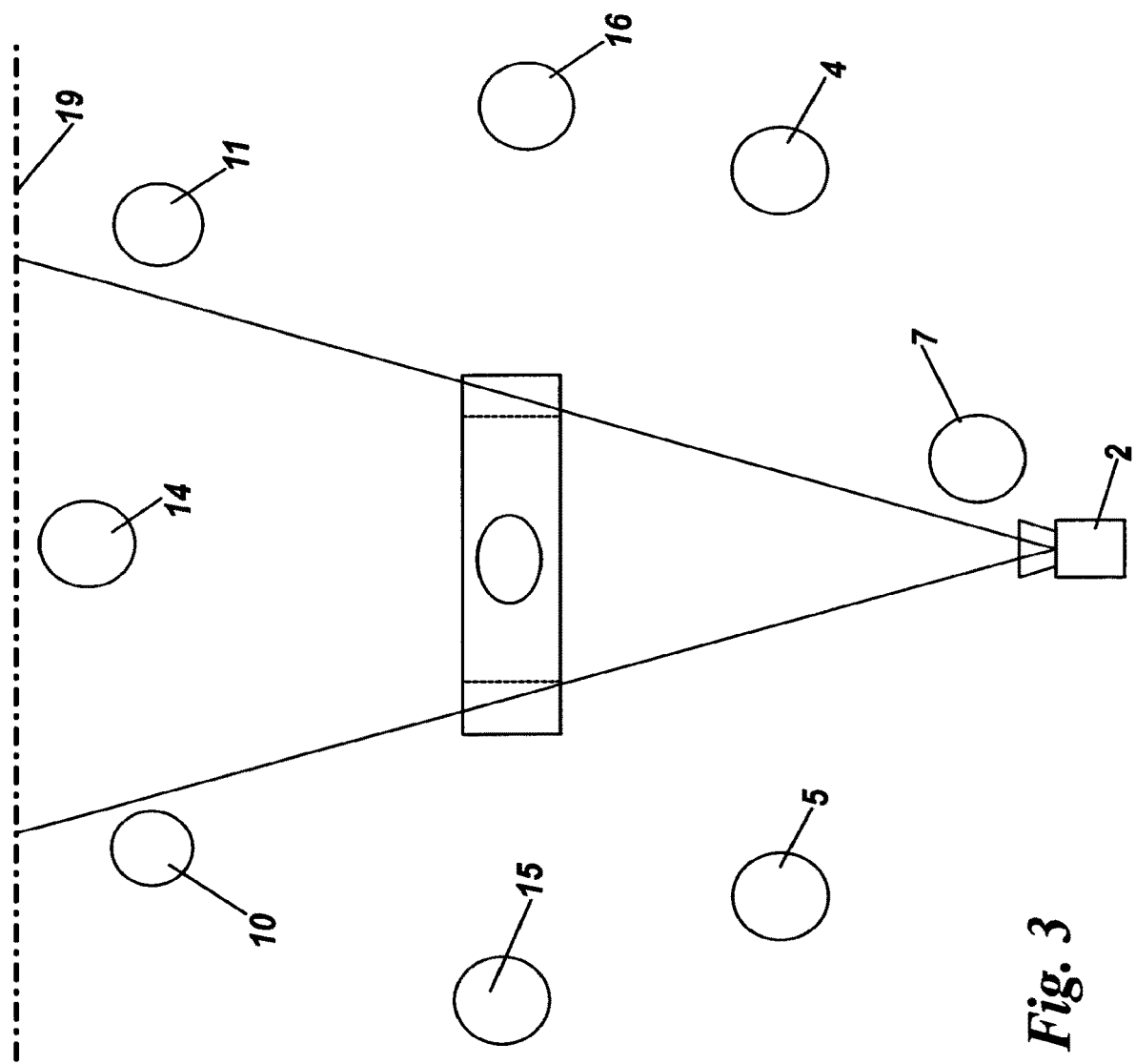
FIG. 3 is a schematic view of the shot captured by the camera as arranged in the studio setup of FIGS. 1 and 2.

Now referring to FIG. 3, the camera is arranged relative to the person such that the image of the person captured by the camera extends across the entire height of the image captured by the camera. This advantageously maximizes the pixel count for the person, optimizing the 10 resolution of the person in the image. In one embodiment, a size of an unmasked plate shot of the camera (i.e. the size of the rectangular plane captured by the camera at the location of stage 1 and perpendicular to the eyeline of the camera) is approximately 2 m by 3.6 m. In some embodiments the camera may be masked.

The camera is configured to have a shutter speed of between $\frac{1}{60}^{th}$ second and $\frac{1}{120}^{th}$ second. It has been found that these shutter speeds sufficiently reduce motion blur without introducing stroboscopic effects, which can occur at higher speeds. The camera is positioned such that an eye line of the camera substantially corresponds to the eye line of an audience watching the Pepper's Ghost image and is at least 4 m away from the subject.

The captured film of the person is delivered to a Pepper's Ghost projection system and projected by the system as a Pepper's Ghost image and, in one embodiment, is projected such that the Pepper's Ghost image of the person appears to an audience the same height as the person in real-life. The film may be communicated via telecommunications to the location at which the film is projected as a Pepper's Ghost image. In this 30 way, the Pepper's Ghost image of the person can be broadcast "live" to the audience. Such a method could be used to allow a person to have a "telepresence" at a location. This may allow the person to provide a presentation to an audience from a remote location or to interact with another party in the manner of a video conference.

Alternatively, the entire film may be delivered after filming has been completed, for example on a data carrier, such as an electronic signal or DVD.

Figure 4:
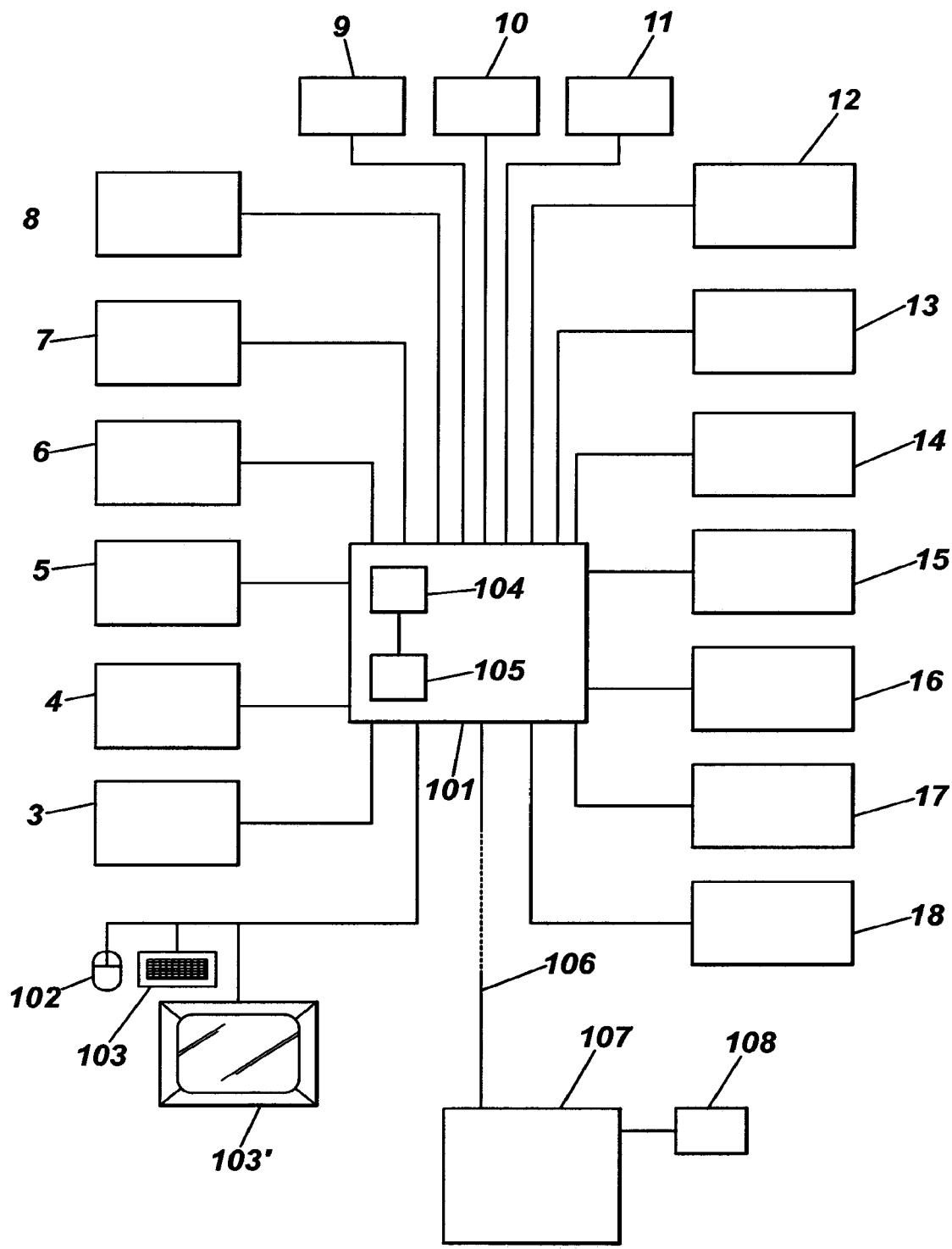
FIG. 4 is a schematic view of a lighting control system for automatically adjusting the lights of the studio setup shown in FIGS. 1 to 3.

Referring to FIG. 4, the lights 3 to 18 may be adjusted under the control of a lighting control system 101. Each of the lights 3 to 18 may have control circuitry (not shown) associated therewith for adjusting the brightness, colour and position of the light in response to control signals from lighting control 101. The device 101 comprising an input device, in this case a mouse 102, keyboard 103 and touch screen 103', for a user to input characteristics of a subject to be filmed into the system 101, outputs for sending control signals to the lights 3 to 18 and a processor 104 arranged to determine from the inputs a required configuration for the lights 3 to 18 and send control signals to each light to cause the lights to adjust to the required configuration.

The system 101 comprises memory 105 having stored thereon a database of lighting configurations, each lighting configuration for a different combination of characteristics of a person to be filmed and projected as a Pepper's Ghost image. In use, the user inputs characteristics, such as skin colour, hair colour and colour of the subject's clothes and shoes, into the system 101 and, in response, the processor 104 retrieves from memory 105 the lighting configuration that corresponds to that combination of selected characteristics. The processor 104 then send signals to the lights 3 to 18 to cause the lights 3 to 18 to adjust to the retrieved configuration.

The system 101 may comprise a display of the touchscreen 103' that displays an image representing a person and the user can select, with an input device 102, 103, 103' different sections of the person and identify the colour of the selected section of the person. The processor 104 5 receives inputs on the colour of each section and searches the required configurations stored in memory 105 based on the inputs to find a configuration suitable for the characteristics of the person. On finding a suitable configuration, the processor 104 sends control signals to the lights 3 to 18 to cause the lights 3 to 18 to adjust to the configuration.

In one embodiment, the different sections comprise vertical sections of the person, for example, when the subject is a person, five vertical sections, hair, head, torso, legs and feet. For practical reasons, such as the available equipment and time it may not be possible to illuminate these sections and another number of vertical sections may be used, for example three vertical sections, head, torso and legs/feet. Furthermore, if the person is not a person but is another object, such as an animal, or the person is wearing clothes or equipment that results in the hair, head, torso, legs and/or feet being of similar colours, then other sections may be appropriate. In one embodiment, left and right sections may be used. For a person that is moving, this may require the lights to track the person across a stage.

In this way, the control system can automatically configure the lights as required by the characteristics of the subject to be filmed, saving time and reducing the need for an expert lighting technician.

The required configurations are determined empirically and then stored in memory.

The system 101 may also be connected by a data link 106, such as a telecommunications link, to a device 107 at a location that the film of the subject is being projected as a Pepper's Ghost image. Device 107 provides feedback to system 101 based on the lighting environment at the location the Pepper's Ghost image is being projected. The device 107 may provide feedback dependent on inputs into the device 107, for example device 107 may itself be a system for controlling lights at the location the Pepper's Ghost image is projected and may provide feedback data to system 101 on the programmed lighting configuration or/and the device 107 may be connected with one or more sensors 108, for example one or more photodetectors, for sensing the lighting environment at the location the Pepper's Ghost image is projected and send data to device 101 on the detected lighting environment.

In response to receiving feedback/data from the device 107, the processor 104 controls the lighting configuration of lights 3 to 18, at least in some embodiments, to match the lighting environment or at least aspects of the lighting environment at the location the Pepper's Ghost in projected. In this way, the realism of the Pepper's Ghost is enhanced as the illumination on the subject being filmed matches illumination the subject would receive if he actually was at the location the Pepper's Ghost image is projected.

As well as trying to match the lighting effects at the location the Pepper's Ghost image is being projected, the processor 104 may also control the lights to achieve a required colour temperature based on the objects/people on a stage on which the Pepper's Ghost image is projected. Furthermore, the processor 104 may control lights 3 to 18 based on feedback from device 107 to achieve special effects, such as increased/decreased transparency of the Pepper's Ghost image.

It will be understood that the invention is not limited to the above described lighting arrangement but other combinations of front, rear and side lights may be used. In one embodiment, the front and back lights comprise a very large array of lights that provide a fine granularity of control of the illumination across stage 1.

It will be understood that in one embodiment, the subject is a member of an audience. In such a situation, it may not be possible to provide a lighting arrangement as described above and front and back lighting may be provided in another manner, for example, spotlights suspended on trusses to provide illumination from a plurality of points.

LED lights may be used for the front, rear and/or side lights. For example, 5600 kW LED lamps may be used. LED lamps consume far less power than incandescent lamps, allowing the lamps to run off battery power, and have a more stable colour shift (i.e. the colour of the light emitted by the LED lamp does not substantially change with changes in brightness). Furthermore, the cool temperature operation of LED lamps negates any need for air conditioning and presents less of a fire risk.

LED's, being solid state electronic components and being relatively small in comparison to other types of lighting, are particularly well suited to being incorporated into lighting arrays. For example a 2-D array of LEDs may be used to from a panel, which may or may not be a planar panel.

Due to the small size of each individual LED in such an array the granularity of the array can be improved in comparison to arrays of other types of lamps.

Optimally the Telepresence filming room or Booth is desired to be of a variety of sizes, typically as small as a room 5 meters long by 3 meters wide up to studio stage arrangements as large as 20 meters wide. It will be understood in large stage arrangements or where the image size is substantially wider than 6 meters and where the studio has sufficient depth of maybe 20 meters or greater, the use of conventional tungsten lighting provides satisfactory results FIGS. 5 to 20 show various lighting plans according to various embodiments of the invention in which LED lamps are used to provide a significant illumination of a subject.

Figure 5:
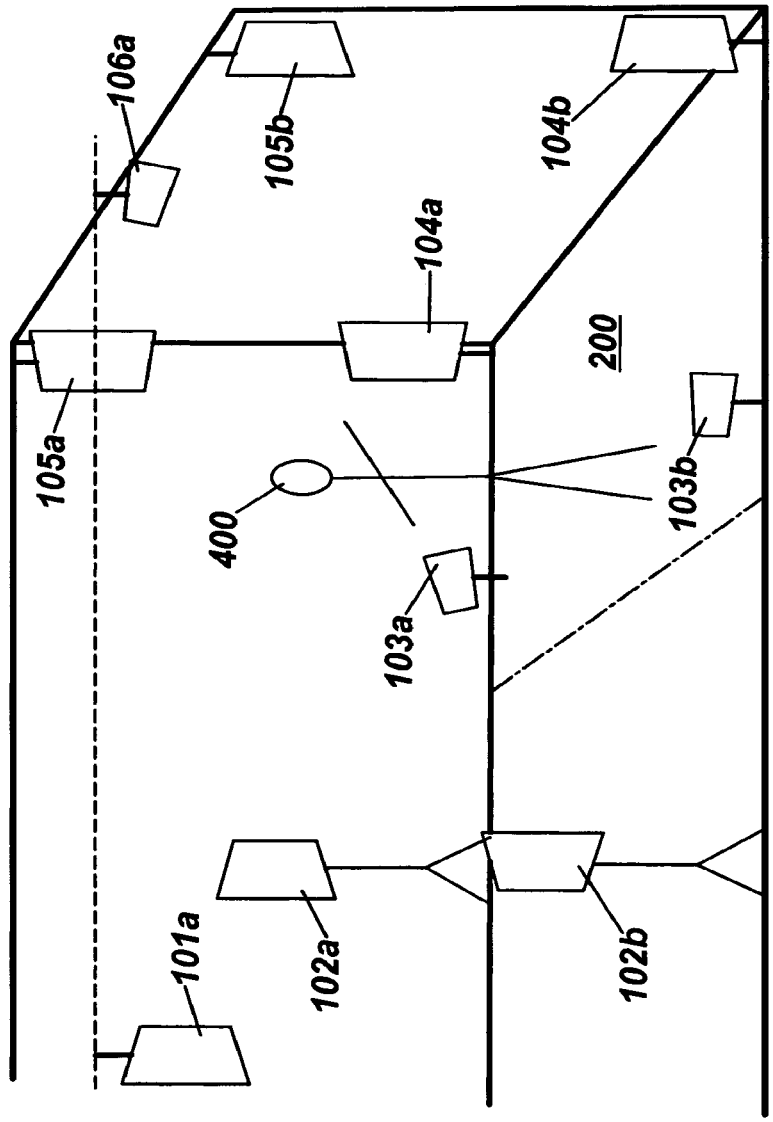
FIG. 5 shows a perspective view of a studio setup for a first lighting arrangement in accordance with another embodiment of the invention, wherein the lighting arrangement comprises LED lamps.
Figure 6:
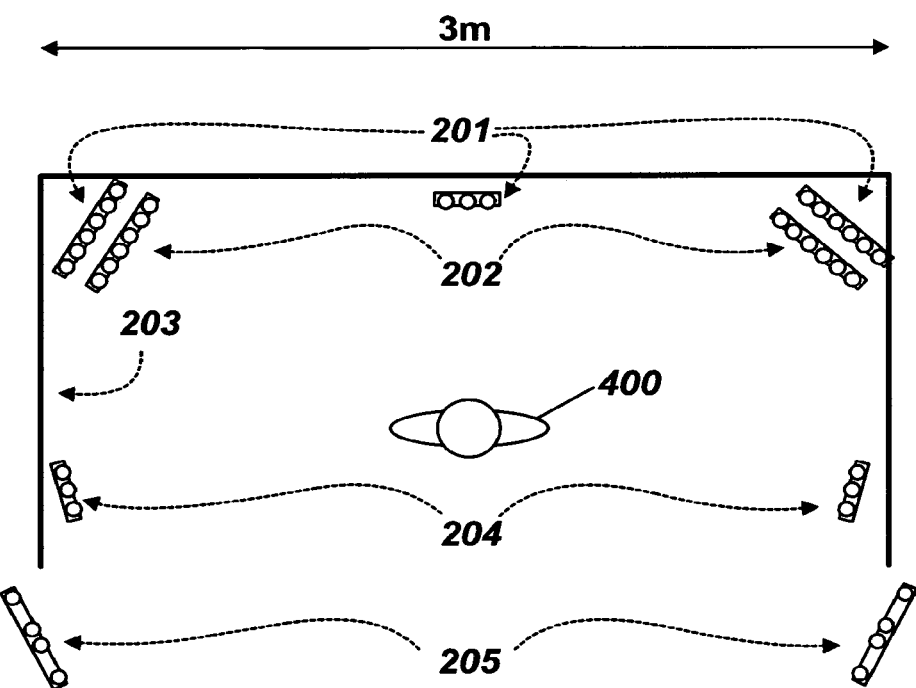
FIG. 6 shows a plan of the studio setup of FIG. 5.
Figure 7:
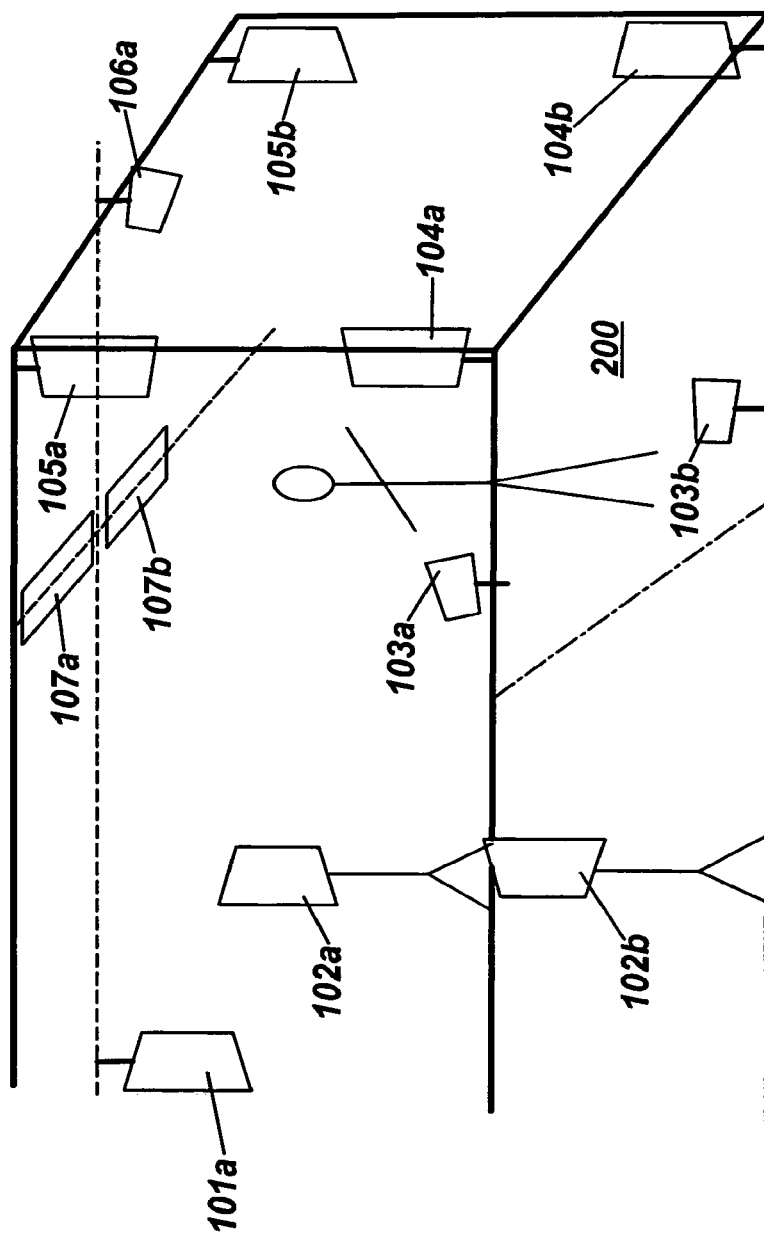
FIG. 7 shows a perspective view of a studio setup for a second lighting arrangement in accordance with another embodiment of the invention, wherein the lighting arrangement comprises LED lamps.
Figure 8:
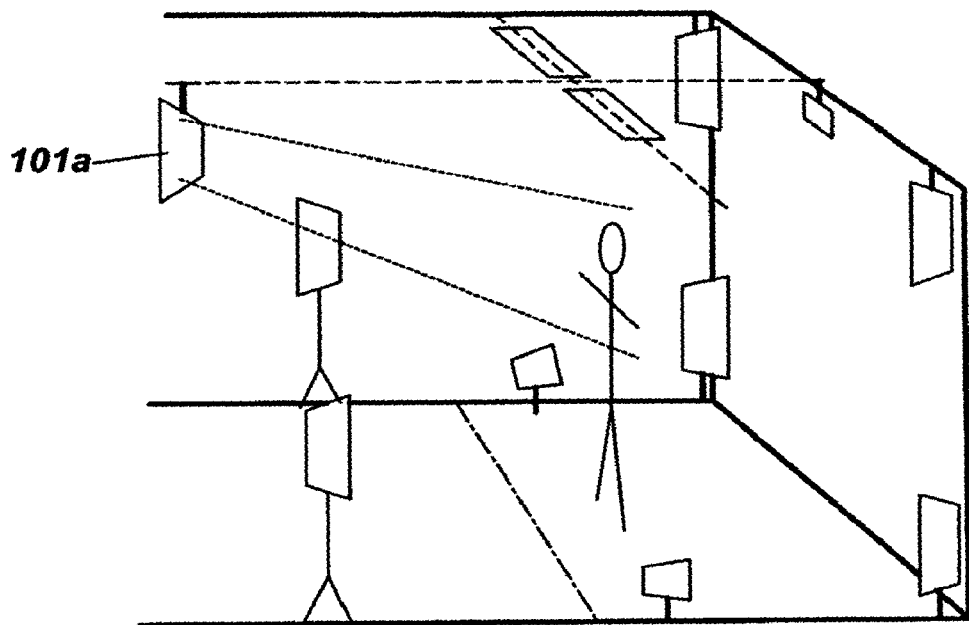
FIG. 8 shows a perspective view of a studio setup of FIG. 7 with the light path illustrated from a light panel arranged to illuminate the face and upper body of a subject.
Figure 9:
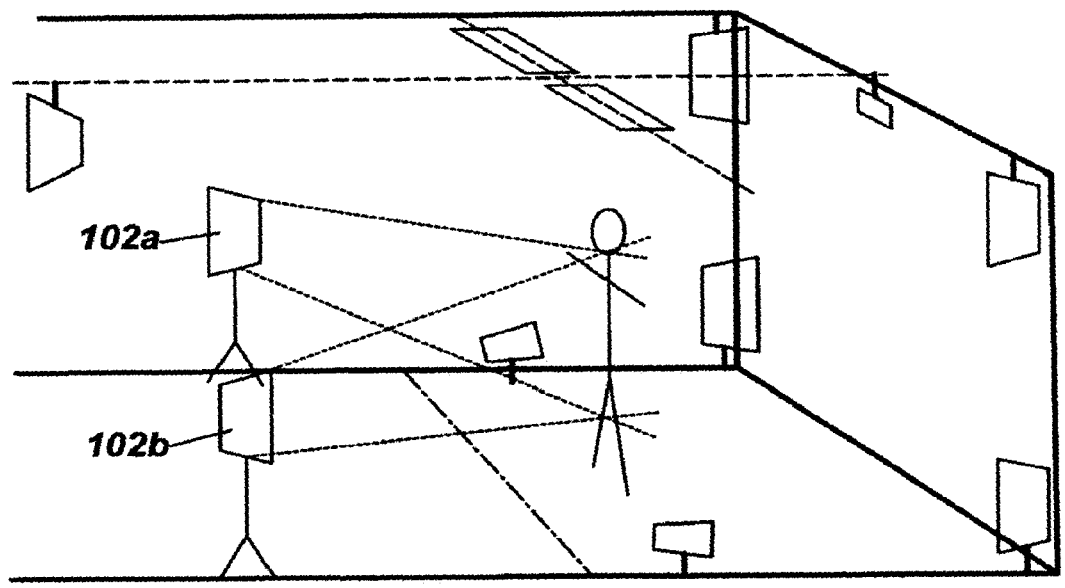
FIG. 9 shows a perspective view of a studio setup of FIG. 7 with the light path illustrated from a light panel arranged to illuminate the darker features of a subject.
Figure 10:
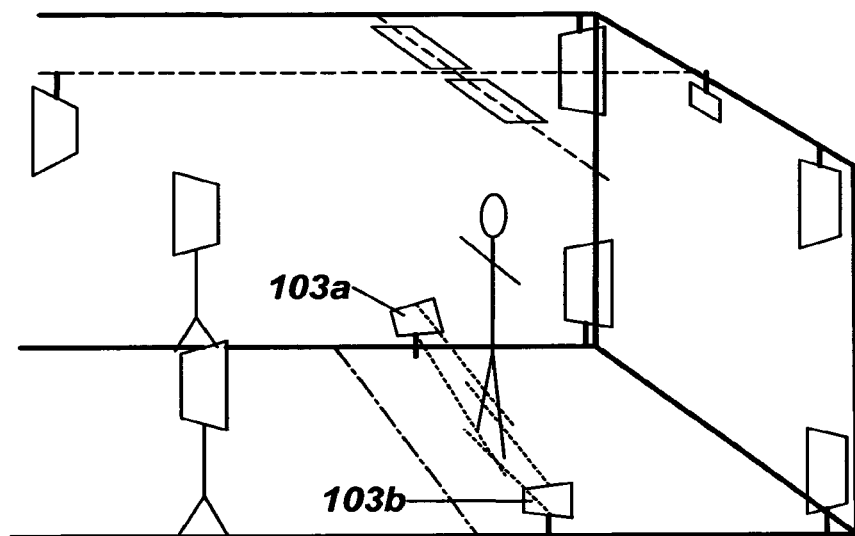
FIG. 10 shows a perspective view of a studio setup of FIG. 7 with the light path illustrated from a light panel arranged to illuminate the lower part of a subject.
Figure 11:
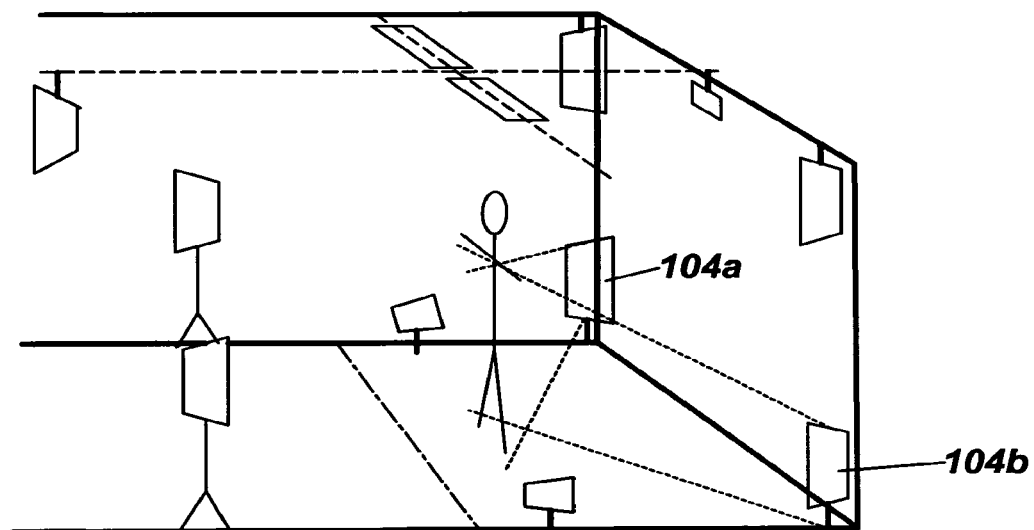
FIG. 11 shows a perspective view of a studio setup of FIG. 7 with the light path illustrated from a light panel arranged to illuminate generally up to the shoulders of a subject.
Figure 12:
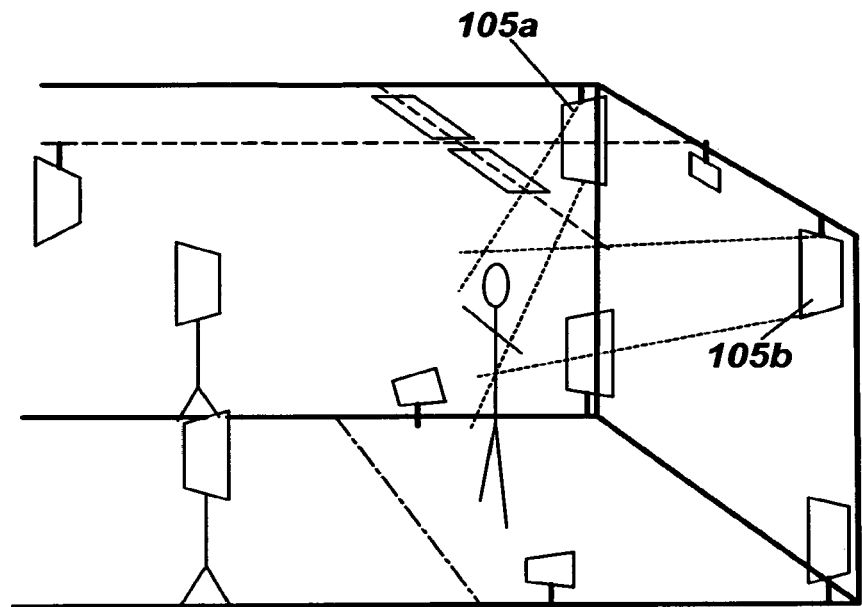
FIG. 12 shows a perspective view of a studio setup of FIG. 7 with the light path illustrated from a light panel arranged to illuminate the head/hear and upper body of a subject.
Figure 13:
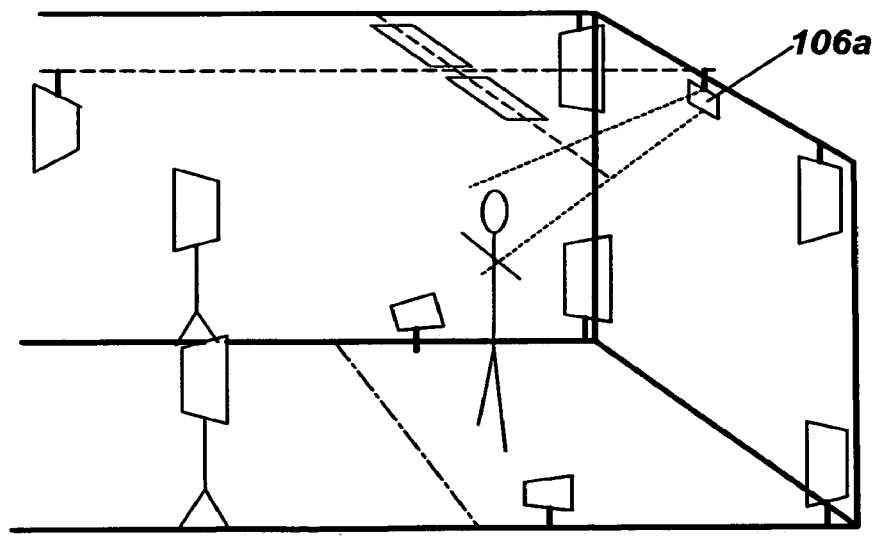
FIG. 13 shows a perspective view of a studio setup of FIG. 7 with the light path illustrated from a light panel arranged to illuminate the head/hear.
Figure 14:
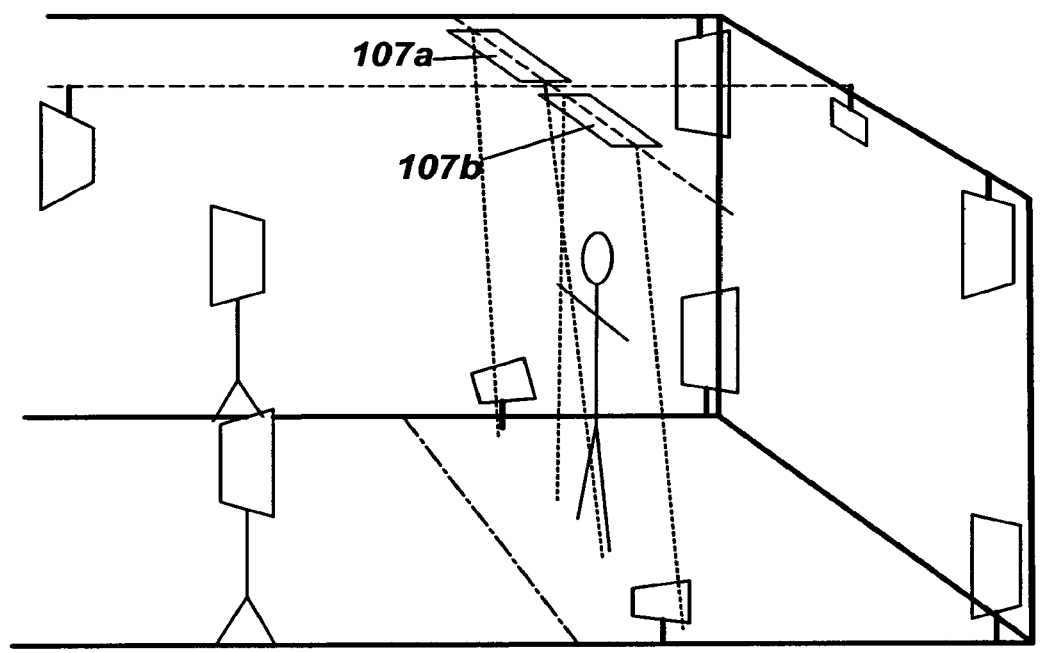
FIG. 14 shows a perspective view of a studio setup of FIG. 7 with the light path illustrated from an overhead light panel arranged to provide rim to the head of a subject.

FIGS. 5 and 6 show a lighting plan in which, for example, the distance from the focal plane of the camera to the subject 400 is approximately 18 feet (5.5 metres). Such a lighting plan can be realised as a Telepresence booth that can accommodate approximately five standing persons within the subject area. Such design and configuration may be "scaled" up or down depending on the number of persons or subject area size that is desired.

The distance between the camera and the subject is determined by the lens focal length and the subject. In this instance in order to capture a full screen vertically standing person that has the ability to extend their arms freely in the frame without falling out of the frame a 40 mm (35 mm format) Lens is used. Lenses in this range fall within the "normal" range of a subjective Point of View ("P.O.V."). Assuming a stage riser of 1 foot (0.3 metres) high is being used to film the subject placing the Lens approximately 2 feet (0.6 metres) off the ground would allow the point of view of the viewer to be within the normal viewing range for the reflected Telepresence image to appear natural on a slightly raised stage. The camera may be able to be adjusted vertically to attain a more "neutral" angle of view for certain applications or viewing situations.

Directly behind the subject is a non-reflecting, preferably light absorbing material or configuration. A black velvet curtain has been proven in the photographic industry to be used for such purposes. This Curtain should have a dimension of approximately 15 feet (4.6 metres) across and 10 feet high (3 metres).

Alternatively a "light trap" may be able to accomplish an even less reflective background. Such device could be concave or have louvers at such an angle that allow "spill" light to pass through the louvers and be "trapped" within a non-reflective area while obscuring the camera's view with the surface of the louver angled perpendicular to the camera s angle of inclination.

The blackness of a black background (e.g. a black velvet curtain) behind a subject can appear reduced due to lighting effects. That is the background can appear grey. A technique known as "crushing the black" can reduce this effect. A method to reduce the intensity of light on the background is to increase the distance between the front lights and the background, either by moving the front lights away from the background or vice-versa. Alternatively, the camera used to film the subject could be arranged to process light sources below a certain threshold value as being black. For example if the light reflected off a back screen is less than one candela, then the camera may process this as being black.

It will be understood that the lights in the lighting arrangement are chosen such that the drop-off distance of the light from the front lights is less than a distance between the front lights and the background behind the subject (e.g. a back screen or a back curtain). This prevents light from the front lights being incident on the back screen at such a high intensity that the contrast between the subject and the back screen is reduced.

A platform (riser) with the dimensions of approx 4×12 feet (1.2×3.7 metres) is desirable of approximately 1 foot (0.3 meters) high. This allows for several people to be captured with movement and isolates the feet against the black velvet better than a floor without a riser would. This riser generally painted black also serves to mitigate the issue of seeing the background where the velvet or "Knock out" curtain meets the floor. It may be desirable in some situations that the surface of the riser be reflective or semi-reflective to some degree. For instance a Black "Marlite" or "TV Tile" riser may give some subtle reflections of feet etc. that may help the illusion that the virtual projected image is "standing" on the physical stage it is being projected in proximity of.

A number of lighting configurations will now be described to address circumstances pertinent to achieving the most realistic virtual image of a filmed subject using most mainstream film shooting conditions.

The lighting plan, illustrated in FIGS. 5 and 6, shows the lighting arrangement for a stage up to 3 metres wide. Such a stage could be positioned in a conventional 30 foot/40 foot (9/12 metres) truck container by adding other sound recording and filming equipment. Such a truck container would make a perfectly suitable Outside Broadcast truck. In the embodiment illustrated a number of different LED Panels "daylight flood instruments" are positioned around the filming subject to form a cuboid of light.

Various different types of LED Panel units may be used. Firstly is a LED 30 Flood Panel, this kind of light emits a wider plane of illumination and is used to provide general lighting levels suitable to an HD filming environment. The next LED Panel unit that may be used is a LED Spot light. This provides a greater intensity of illumination in a more focused light path. A third kind of light is a Light mini panel which is designed to illuminate smaller more focused areas of subject matter, such as the subject's hair or shoes.

According to the lighting plan, LED Flood Panel 101A is lighting primarily the upper part of the body and subject's face with a general flood of light, the intensity and brightness of LED Panel 101A is set to provide this sufficient illumination to highlight the film subject whilst minimizing light bleed or spill along the back wall. LED Panel Spots 102A and 102B are used for focused illumination of the subject's darker features such as eye sockets, facial hair and darker clothing/shoes where necessary. Light panels 102A and 102B have a semi-opaque diffusion panel immediately in front of the LED array to slightly soften the more brittle beam of the spot light. LED Mini Panel 103A and 103B will maintain the light intensity balance of the lower part of the subjects body (trousers, shoes and stage riser) allowing the film subject to move left and right while maintaining the correct intensity of light. LED Flood Panels 104A and 104B illuminate from behind the filmed subject a general area up to the subject's shoulders creating a rim light effect to sharpen the outline of the subject's body. LED Flood Panels 105A and 105B offer similar lighting effects of 104A and 104B but for the upper part of the body and the head/hair of the filmed subject. The general impact of 104A, 104B, 105A and 105B add the illusion of luminosity from behind that audiences typically view when watching subjects perform on a live stage, such as found in a theatre or conference centre. The LED Mini Panel 106A provides rim light to add further sharpness and definition to the filming subjects head. It should be noted that this light may only be used where the height of the studio is sufficient to allow the placement of this light outside the frame of the camera (typically when the ceiling height is greater than 3 meters).

Referring to FIG. 6, the key in this Figure shows graphics which represent a Lite Flood Panel 210, a Lite Spot panel 211, and a Lite mini Panel 212. Illumination of the subject 400 to be filmed is provided by various lights including lights that may be attached to the ceiling 201 and floor lights 202 to provide reverse key lighting for highlighting the hair. Low level lighting 204, for example floor lights, can provide highlighting for, say, the shoes of a subject. Front fill spotlights 206 attached to, say, the ceiling can be used to highlight a subject and to minimize light spill on the backdrop. Diffuse lighting can be provided by lights on floor stands 205, for example 1 m high floor stands.

According to the lighting plan, illustrated in FIGS. 7-16, LED Flood Panels 107A and 107B provide overhead lighting to illuminate film subjects of darker skin complexion or dark hair. There is new technology being developed that angles the LED's on the Panel, this new embodiment of the "LED Panel" allows the units be mounted in a more flat or parallel fashion to the room's walls and ceilings. This could be particularly useful in a booth constructed so that the illumination devices are flush fastened to the walls or built in to the structure. In some scenarios it may be advantageous to add some overhead or top light to fill the horizontal areas of the subject. This can also lower the contrast a bit when it is desirous to place the subject realistically is a "daylight" or other more real and less theatrical looking environment. Almost as if introducing "ambient Skylight". Given that the distance from the subject when standing to the overhead light is only a few feet (approx. 10') it is advantageous to use a shallow profile cools light that has good "spread". As an alternative to the LED Flood Panels, 2 Kino Flo 4×2's would also be ideal with 216 diffusion.

Figure 15:
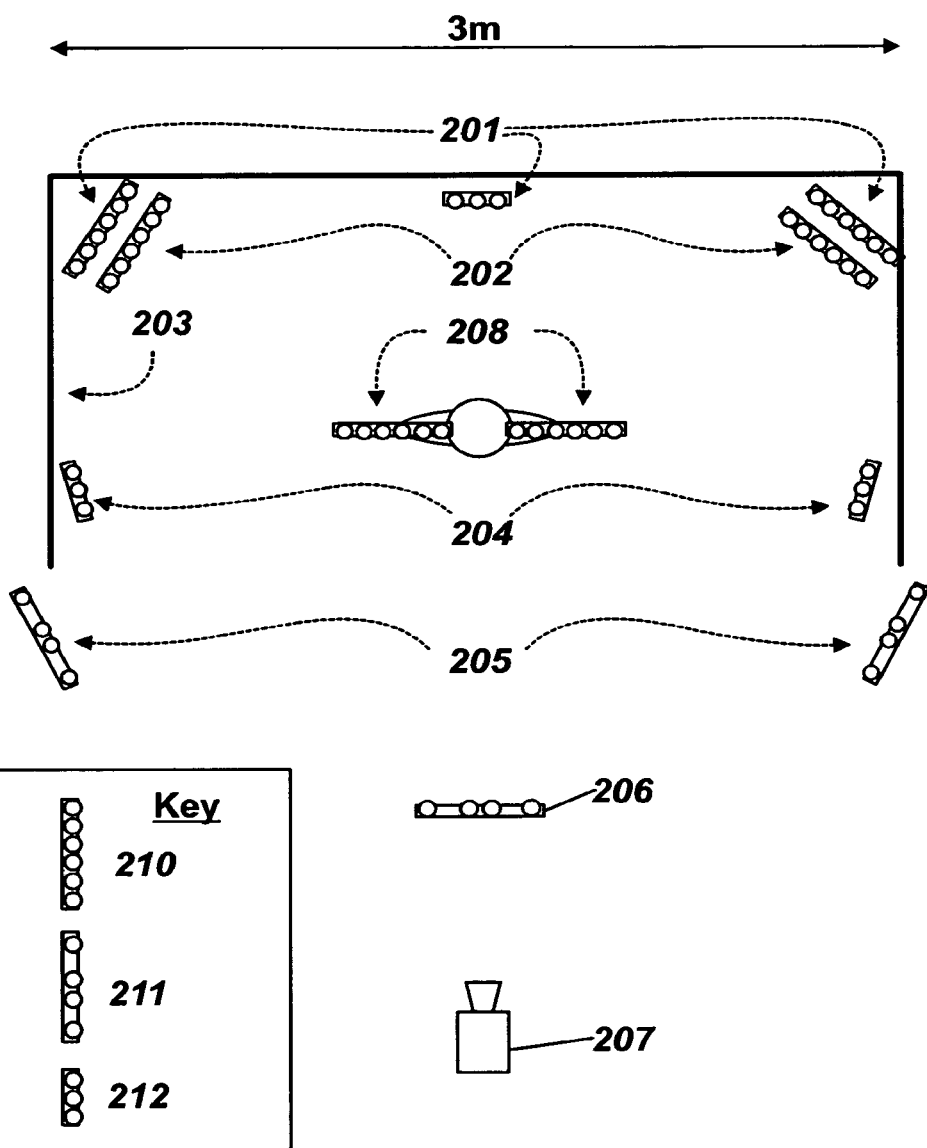
FIG. 15 shows a plan of the studio setup of FIG. 7.

Referring to FIG. 15, ceiling lights 208 are illustrated that may be used to highlight a person who has dark hair. The other lights illustrated in this Figure may be the same or similar to at least some of the lights illustrated in FIG. 6 and take like reference numerals.

Figure 16:
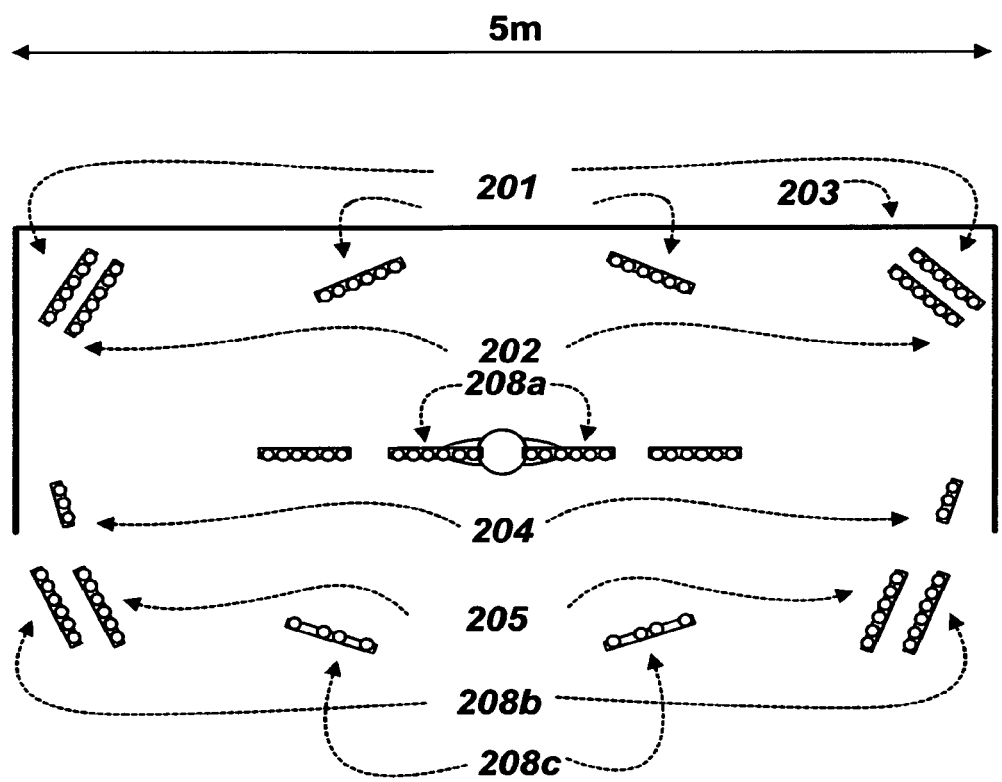
FIG. 16 shows a plan of the studio of a studio setup for a third lighting arrangement in accordance with another embodiment of the invention, wherein the lighting arrangement comprises LED lamps.
Figure 16:
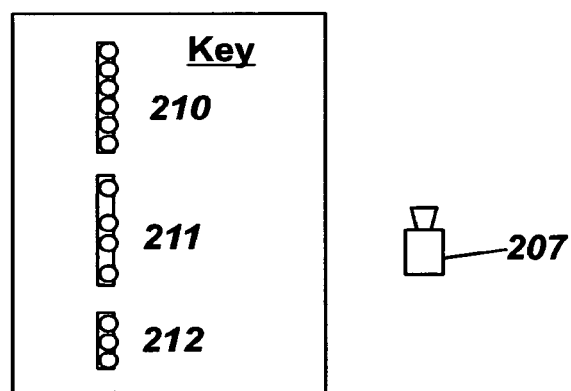

Referring to FIG. 16, ceiling lights 208a above the subject are again illustrated that may be used to highlight a person who has dark hair. Additional ceiling lights are also illustrated that are in front of the subject (i.e. camera side) and either in line with the subject or to the side of the subject (labelled 208b and 208c respectively). The other lights illustrated in this Figure may be the same or similar to at least some of the lights illustrated in FIG. 6 and take like reference numerals.

Figure 17:
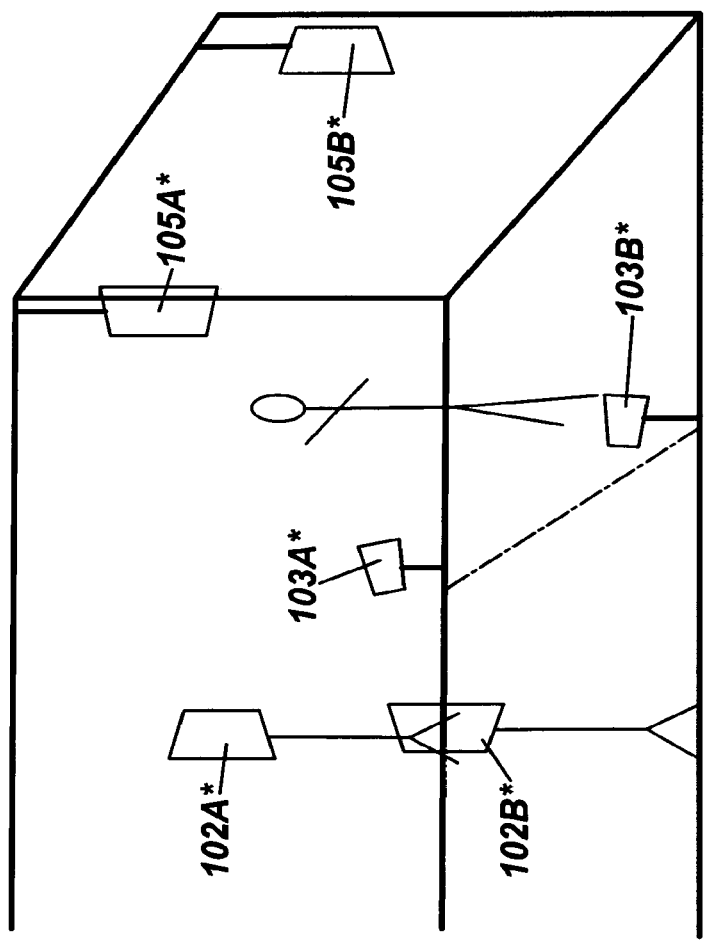
FIG. 17 shows a perspective view of the studio of a studio setup for a fourth lighting arrangement in accordance with another embodiment of the invention, wherein the lighting arrangement comprises LED lamps.
Figure 18:
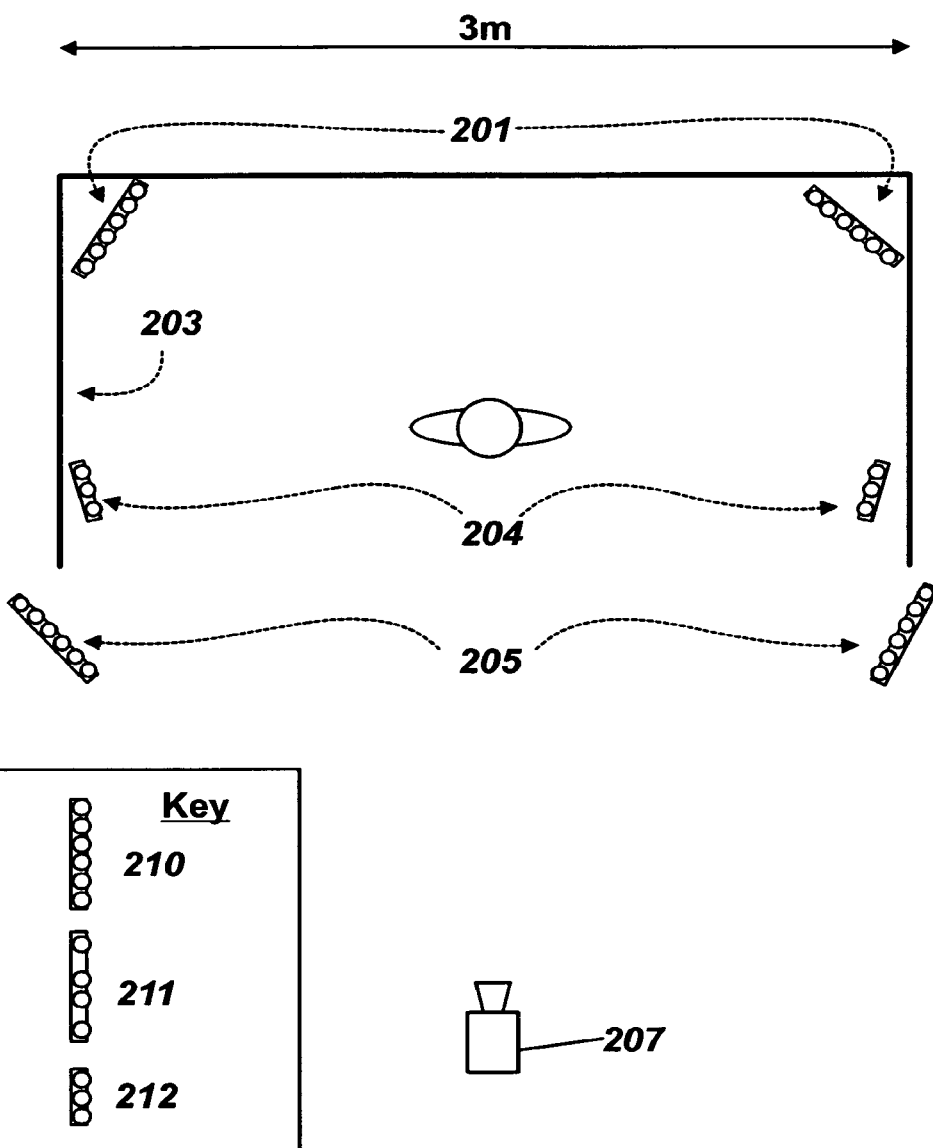
FIG. 18 shows a plan of the studio setup of FIG. 17.

FIGS. 17 and 18 illustrate a lighting plan which is a basic configuration which enables a reasonable virtual image to appear. A total of just six LED Panels are used, four LED Flood Panel and two LED Mini Panels. The Flood Panels are all fitted with diffusion screens to spread a soft edged light directionally into the cuboid which for the purposes of this embodiment of the invention extends across the entire width and depth of the riser to the maximum height required for image capture of the filmed subject (generally no more than 2.2 metres for a human being).

At a height approximately 2 feet (0.6 metres) above the eye line of the subject (8 feet/2.4 metres) and angled down slightly to illuminate the full figure two 1×1 LED Panels placed downstage of the subject can cover the "action area" of the platform. Positioned in a horizontal side by each array that cascades approximately on the line from the camera to the platform edge.

Use of one of the lighter diffusion elements that are provided (with the LED Panels 1×1 kit) to be used in the diffusion element holder creates a flattering degree of softness of this light and helps to make the field of illumination more even. FIG. 18 illustrates lights fitted with diffusers which may, for example, be placed on floor stands (e.g. 1.5 m floor stands).

The choice of "daylight" (approx. 5500 degrees Kelvin) optimizes the response from many of today's High Definition Camera Systems. A slightly warming gel such as the ¼ CTO gel provided for use with the diffusion holder can simultaneously be used with the diffusion elements to adjust the quality (colour temperature) of the light for a pleasing slightly warm flesh rendition.

A further advantage of lighting with a "Daylight" source is that contamination or "spill" that may come from windows in close proximity to the shooting environment would be less obtrusive allowing this lighting arrangement to work effectively in a smaller space such as an office or Outside Broadcast truck.

Furthermore the properties of this LED based lighting solution could allow for the Telepresence booth to be incorporated in a Tent like structure, an inflatable structure or other novel (possibly portable) integrated "Image Capture/Image Display" environment.

The "Fill" (opposite from the Key) or "shadow" side of the subject can be illuminated in a similar fashion to the "Key side" utilizing fewer lights (2) and heavier diffusion thus adding a softer and comparatively dimmer "Fill" to the shadow side of the subject. Built in Dimmers incorporated in the LED Panels 1×1's (or similar instruments) allow minute adjustment for just the right level of Fill for the subject. Of course the Key Level can be equally controlled. At these distances the light level achieved is consistent with the optimal performance of the desired Lenses. This Level is approximately a T2.8-T4 at 320ASA.

To "separate" the subject from the background the LED Panels 1×1's can be utilized as "Back light" and perhaps positioned as a bit of sidelight as well.

To attain good detail from the background and help the dimensional appearance of the subject it is optimal to illuminate the hair/head shoulders, torso and extremities of the subject from behind the subject. In this scenario it may be optimal to utilize two LED Panel 1×1's just down stage (approximately a foot) of the Black curtain. If one of the Light Panels (1×1 flood) is positioned near the end of the (15') curtain flush to the ceiling or top of the curtain height and another LED panel 1×1 is positioned half way to the centre of the subject (3½'/1.0 metres) these lights when angled in unison can illuminate the subject(s) in a pleasing and effective side/backlight position. By using another pair of the same lighting instruments in the same configuration on the other side full coverage of this important illumination is attained on the subject.

The black velvet curtain can be positioned quite close to the subject (approximately 9'/2.7 metres upstage) without being significantly illuminated due to the directionality and angle of this lighting scenario and the properties of the lights specified. It may be desirable to add a "flag" to "Top" or "Side" control some of the emitted light off the background. The use of a honeycombed "egg crate (s)" may also be desirable in some situations to control the directionality/spill of the light however such (LED Panels) instruments as described perform their function well as described.

The instant dim ability with nominal colour change on these LED based lights combined with the fast diffusion and colour gel slot system allows the Director of Photography or Lighting Technician to quickly and easily adjust the quality, quantity and colour of the light to optimize the results with various subjects. Improvements are being made to LED Panels which may incorporate LED's of different angle of view, colour temperature, and angle, these may be particularly useful in "spotting" or "warming" various subjects particularly in the backlight position. This lighting scenario when installed allows for optimal image capture for a myriad of subjects with in this space. It forms a basic "look" that will produce good results with no changes for almost every subject. The ability to add dramatic effect, soften and warm flesh tone, increase or decrease key, fill or backlight etc. to tailor the light for the specific subject or desired result can all be accomplished in seconds. The integrated control designed into a high output, low power consuming, long lamp life, completely cool, high quality, and impressive CRI makes these luminaries ideal for this application.

Figure 19:
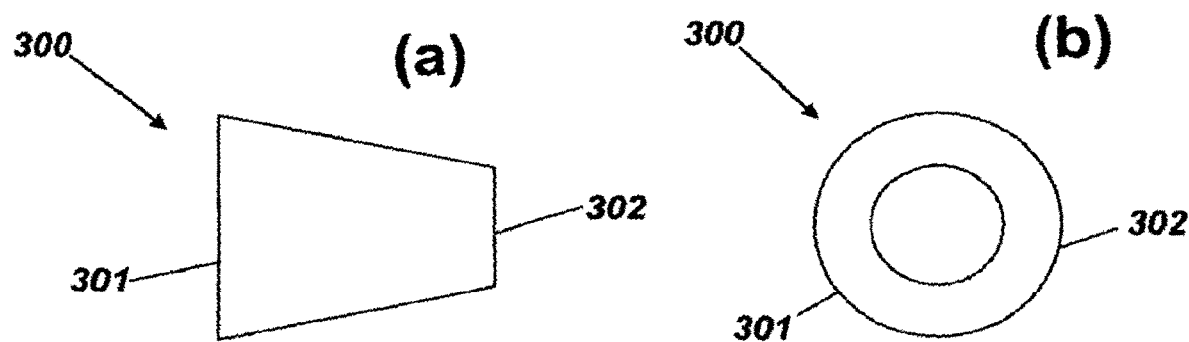
FIG. 19 shows, in accordance with an embodiment of the invention, a light hood.
Figure 20:
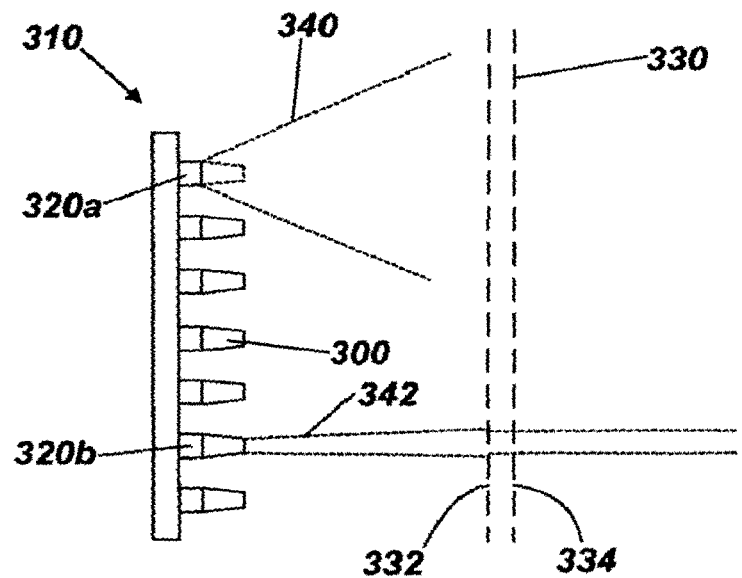
FIG. 20 shows, in accordance with an embodiment of the invention, an LED array with light baffles/hoods.

LED lamps generally tend to produce divergent light which causes light o spill from the sides of the lamp. To reduce this light spill, according to an embodiment of the invention, a hood or baffle may be used to direct light produced from an LED lamp. An example of a hood 300 is illustrated in FIG. 19 (*a*) and FIG. 19 (*b*). The hood 300 illustrated is frustoconical although the hood 300 may take other shapes (e.g. cylindrical). Generally the hood 300 has a first end 301 with a first aperture which is, in use, arranged to receiving light from the LED and a second end 302 with a second aperture arranged to allow said received light to escape the hood 300. In some embodiments, e.g. when the hood 300 has a frustoconical shape, the second aperture is smaller than the first aperture As illustrated in FIG. 20, a hood 300 or an array of hoods may be arranged relative to the light outputs of an array of LEDs 310. One of the LEDs 320*a* is illustrated without a hood 300 together with a schematic representation of the light output 340 of this LED. The light output 342 is also schematically illustrated for an LED 320*b* which has a hood 300 fitted. Generally, there is a one to-one correspondence between the hoods and the LEDs such that each LED has its own hood 300. Such an arrangement is illustrated in FIG. 19. In some embodiments a hood 300 or an array of hoods is arranged to be retrofitted to an LED or an array of LEDs. The hood 300 may be made substantially of plastic, rubber or other light absorbing material or the hood 300 may be made of another type of material with the inner surface of the hood 300 (upon which the light from the LED is incident) is substantially plastic, rubber or other light absorbing material.

Also illustrated in FIG. 20 is a beam collimator 330 which comprises a first array of apertures 332 on the LED side of the beam collimator 330 and a second array 334 of apertures on the subject side of the collimator 330. One or both of the arrays of apertures 332 and 334 may be slideable (or otherwise translatable) relative to each other to aid alignment. Similarly, the beam collimator 330 may be slideable with respect to the array of LEDs 310. By sliding/translating either or both of the arrays, or by translating the beam collimator 330 with respect to the arrays of LEDs, the effective aperture presented to the beams produced by the array can be controlled. In this way the size of the beam directed to the subject can also be controlled and also the light attenuated.

When the two arrays of apertures 332 and 334 are brought into alignment with each other, and the array of LEDs 310, the light on the subject side of the collimator is substantially collimated.

Figure 21:
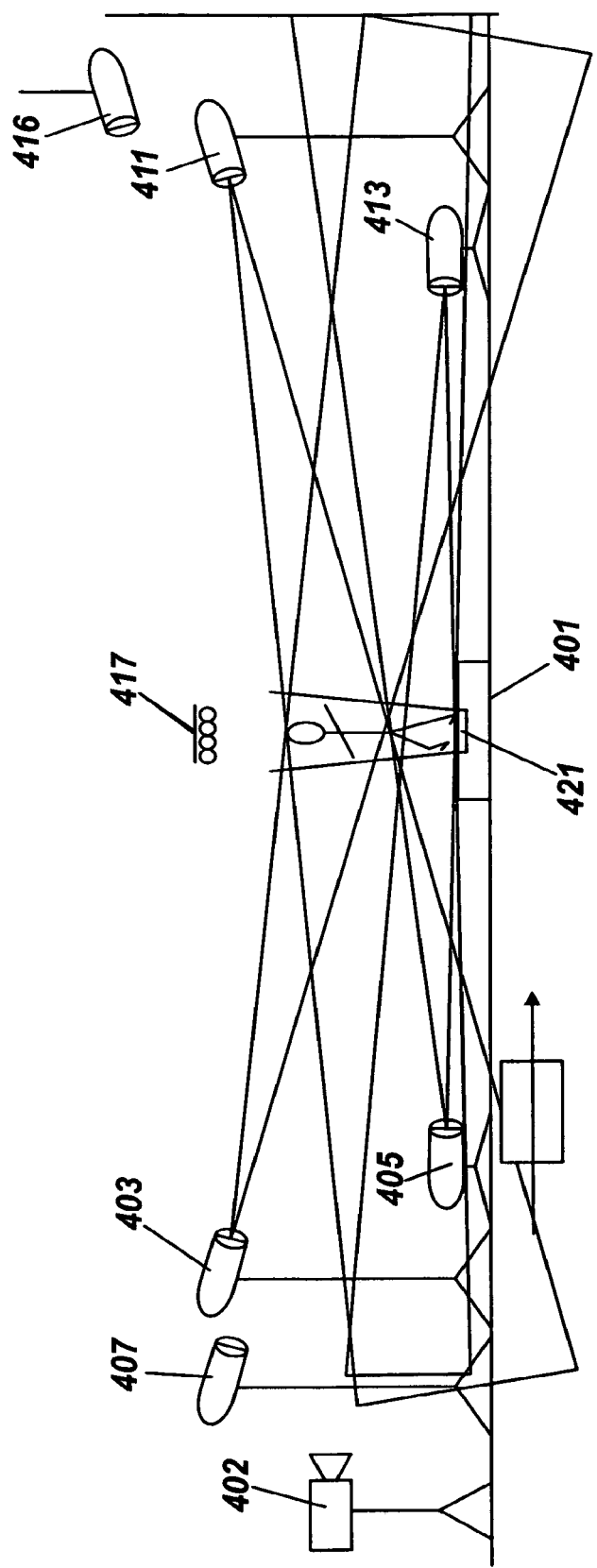
FIG. 21 shows a cross-sectional view of a studio setup for a lighting arrangement in accordance with another embodiment of the invention.
Figure 22:
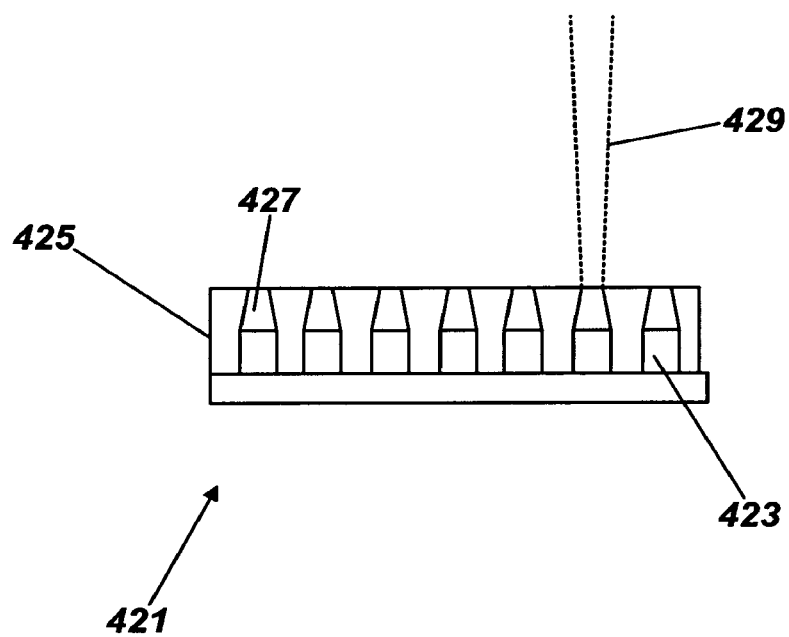
FIG. 22 shows, in accordance with an embodiment of the invention, a floor light with an LED array with light masks.

A further embodiment is shown in FIGS. 21 and 22. The embodiments shown in FIGS. 21 and 22 differ from that of the embodiment shown in FIGS. 1 to 3 in that the embodiment shown in FIGS. 21 and 22 includes floor lights 421. Features of the embodiment shown in FIGS. 5 21 and 22 which are the same or similar as those shown in FIGS. 1 to 3 will not be described further and have been given the same reference numerals but in the series 400.

The floor lights 421 are located in the stage 401 directly below the person being filmed by camera 402. The floor lights are arranged such that the emitted light is directed upwardly approximately perpendicularly from the stage 401 floor such that the light emitted by the floor lights 421 is incident on the underside of the person. The floor lights 421 illuminate areas of the person which would otherwise not be illuminated by either the front lights 403 to 409, rear lights 410 to 414, side lights 415 to 416 or overhead lights 417 to 418. For example, the underside of the person's feet may be illuminated by the floor lights 421.

The upwardly direction of the light emitted by the floor lights 421 prevents light from the floor lights 421 falling on the camera 402. If light from the floor lights 421 were to fall on the camera 402 the floor lights 421 may appear in the projected image, which would be detrimental to the illusion.

An enlarged image of the floor lights 421 is shown in FIG. 22. The floor lights 421 comprise an array of LEDs 423 in a housing enclosure 425. An array of masks 427 are attached to the light emitting ends of the LEDs 423. The masks 427 are made from plastic, rubber or any other light absorbing material and have a frustro conical shape such that the light is collimated by the masks 427 into a beam which is substantially parallel and directed perpendicular to the light emitting surface of the LEDs. The collimating effect of the masks 427 is shown by the dotted lines 429 in FIG. 22 which represent the light emitted by the floor light 421.

In other embodiments the floor lights 421 may comprise a number of different kinds of lights. For example, the floor lights 421 may be spot lights located below the top of the stage 401 floor.

Figure 23:
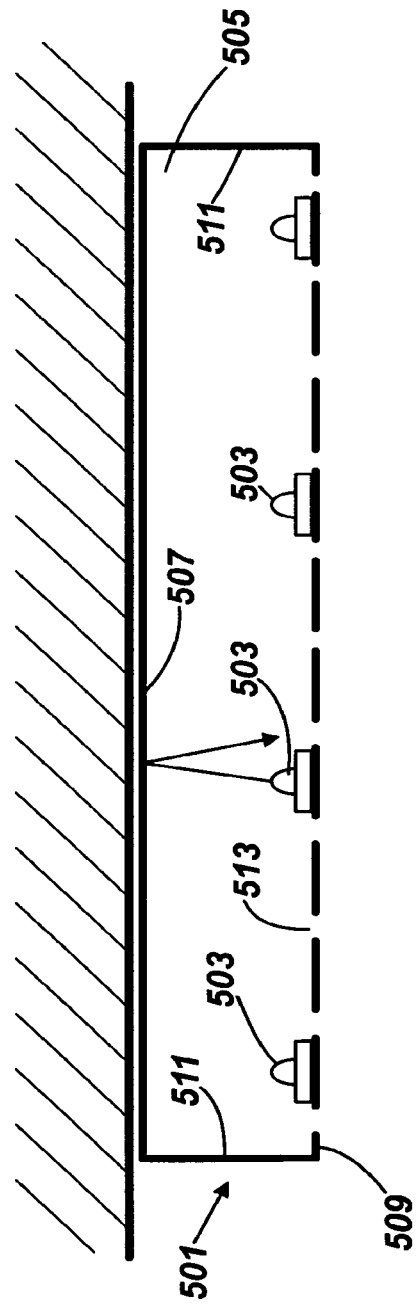
FIG. 23 shows, in accordance with an embodiment of the invention, a luminaire comprising an LED array inside a chamber with reflective surfaces.

FIG. 23 shows a schematic drawing of a luminaire 501 which may be used to illuminate a subject. For example the luminaire 501 may be used for front lights, rear lights, side lights, overhead lights or floor lights as shown in FIG. 1 to 2 or 5 to FIGS. 5 to 18. The luminaire 501 comprise an array of LEDs 503 arranged inside a housing chamber 505 comprising a back reflective surface 507 opposite to an output surface 509 and two side reflective surfaces 511. The LEDs 503 are attached to the inside of the output surface 509 such that the LEDs 503 emit light inside the chamber 505 away from the output surface 509 towards either the back reflective surface 507 or one of the side reflective surfaces 511. The output surface 509 has a number of gaps 513 such that the light reflected off the back reflective surface 507 or side reflective surfaces 511 exits the chamber 505 via the gaps 513. The backs of the LEDs 503 are opaque such that light is blocked from leaving the luminaire 501 without being reflected by the back reflective surface 507 or one of the side reflective surfaces 511. This creates a light output from the luminaire 501 which is approximately uniform over the angles in which lights exits through the gaps 513 in the output surface 509.

Aspects and embodiments of the invention herein described as method, apparatus, lighting arrangements, lighting controls, and lighting systems are interchangeable. For example, an embodiment or aspect of the invention described as a method can also be implemented as an apparatus (and vice versa) and is hereby taken to be disclosed as such. Similarly an embodiment or aspect of the invention described as a lighting control or lighting arrangement can also be implemented as part of a lighting system. Therefore disclosures of embodiment or aspect of the invention in any one particular category should be taken to be also disclosed in the other categories.

Some aspects and embodiments of the invention are complimentary and have a synergistic effect and some aspects embodiments can be realized either alone or in combination with other embodiments. For example the use of LEDs in a lighting arrangement has its own advantages whilst the control of configuring a lighting arrangement in response to various inputs has its own, generally different advantages. The combination of LED lighting and lighting control has further, synergistic, advantages because the quick response time, small size, and solid state integration available from LED lighting means that reliable control and real-time/live control are readily achieved.

Thus, although there have been described particular embodiments of the present invention of a new and useful METHOD AND SYSTEM OF FILMING, it is not intended that such references be construed as limitations upon the scope of this invention.

What is claimed is:

1. A method of filming a subject to produce film suitable for projecting in a manner that creates a full bodied Pepper's Ghost of the subject, the method comprising:
    filming a subject in front of a black, blue, or green back screen under a lighting arrangement to acquire images of the subject, the lighting arrangement having one or more first lights for illuminating a front of the subject, wherein the first lights have a drop-off distance such that the majority of light emitted by the first lights is not reflected by the back screen back to the subject or are angled such that the majority of light emitted by the first lights is not reflected by the back screen back to the subject, one or more second lights for illuminating the rear and/or side of the subject and operable to sharpen an outline of the subject, and one or more third lights for illuminating the feet of the subject;
    wherein the camera used to film the subject is stationary, the subject is a moving subject and the lighting arrangement is arranged to produce shadows in the subject's clothing and cause shadows to move across the subject as the subject moves under the lighting arrangement; and
    wherein the lighting arrangement is arranged to illuminate undersides of the subject's feet so that the base of the subject's feet are captured and displayed on the projected film.

2. The method of claim 1, wherein the subject is filmed on a riser having a height and the subject is filmed with the camera having a lens that is positionable at a height approximately 1 foot higher than the height of the riser, the camera being vertically adjustable in an upward direction to obtain a more neutral view of the subject.

3. The method of claim 1, wherein the subject is filmed in a studio having a depth between 5 meters long by 3 meters wide and up to 20 meters long by 6 meters wide.

4. The method of claim 1, wherein the subject is filmed on a reflective or semi reflective riser.

5. The method of claim 1, wherein the subject is filmed in front of a light-absorbing back, and wherein a camera used to film the subject or the film to be presented is arranged to process light sources having an intensity of below a threshold value as being black.

6. The method of claim 1, wherein:
    the total brightness of the one or more front lights, as measured at the subject, is less than or approximately the same as total brightness of the one or more back lights, as measured at the subject; and/or
    a ratio of the total brightness, as measured at the subject, of the back lights to the total brightness of the front lights, as measured at the subject, is greater than 2:3; and/or
    the total brightness of the front lights is less than 150% of the total brightness of the back lights.

7. The method according to claim 1, wherein the one or more front lights and the one or more rear and/or side lights each comprises different lamps for illuminating different sections of the subject, wherein the different sections comprise vertical sections of the subject.

8. The method according to claim 7, wherein the one or more front lights comprise a profile spotlight for illuminating a head of the subject, a profile spotlight for illuminating the torso of the subject, and a profile spotlight for illuminating legs and feet of the subject, and the one or more back lights comprise a profile spotlight for illuminating a head of the subject, a profile spotlight for illuminating the torso of the subject, a profile spotlight for illuminating legs and optionally feet of the subject.

9. The method according to claim 1, wherein the lighting arrangement further comprises an overhead light positioned substantially directly above the subject, the one or more front lights further comprise a profile spotlight for illuminating the eyes of the subject and a fill lamp for illuminating the subject from below and producing shadows in the clothing of the subject.

10. The method according to claim 1, wherein the lights are controlled to match lighting effects for the subject being filmed to lighting effects at a location of the projected Pepper's Ghost image.

11. The method according to claim 1, wherein the lights are controlled to create a color temperature for the subject being filmed that substantially matches the color temperature of person/objects at the location of the projected Pepper's Ghost image.

12. The method according to claim 1, wherein filming the subject comprises filming the subject with a camera positioned such that an eye-line of the camera substantially corresponds to an eye-line of an audience watching the image and is at least 4 meters away from the subject.

13. The method according to claim 1, further comprising: projecting the images of the subject through a semitransparent screen positioned at an angle to the projected film and an audience line-of-sight such that film images are visible to the audience as a pepper's ghost superimposed on a backdrop to the screen such that the image of the subject appears at the same height as the subject in real-life.

14. The method according to claim 1, further comprising: projecting the images of the subject onto a semitransparent screen placed at 45 degrees to a direction of light emitted by the projector such that the image of the subject appears at the same height as the subject in real-life.

15. The method according to claim 1, wherein the lighting arrangement has a luminaire comprising an array of LEDs inside a housing chamber having a back reflecting surface opposite an output surface with at least one gap, and two side reflective surfaces, wherein the LEDs are attached to an inside of the output surface such that light emitted by the LEDs is directed away from the output surface towards either the back reflective surface or the one of the side reflective surfaces, wherefrom the light is reflected toward the output surface and emitted from the chamber via the at least one gap.

16. A real time streaming telepresence system, comprising:
   an image source arranged to project a full bodied human image directly towards a semitransparent screen for receiving the full bodied human image projected by the image source and generating and directing a partially reflected full bodied human image toward an audience, the partially reflected human image being perceived by the audience as a virtual life size full bodied human image or hologram on a stage;
   wherein the full body human image projected by the image source is filmed using a filming studio including a black, blue, or green back screen positioned behind a subject area in which the subject moves or is positioned during filming, and a lighting arrangement having one of more first lights for illuminating a front of the subject when viewed from a camera used to film the subject, wherein the first lights have a drop-off distance such that the majority of light emitted by the first lights is not reflected by the back screen back to the subject or are angled such that the majority of light emitted by the first lights is not reflected by the back screen back to the subject, and one or more second lights for illuminating the rear and/or side of the subject and operable to sharpen the outline of the subject, and one or more third lights for illuminating the feet of the subject, wherein the camera used to film the subject is stationary, the subject is a moving subject, and wherein the lighting arrangement is arranged to illuminate undersides of the subject's feet so that the base of the subject's feet are captured and displayed on the projected film.

17. A system according to claim 16, wherein the image source projects directly towards the semitransparent screen from above the stage or below the stage.

18. A real time streaming telepresence system, comprising:
   a semi-transparent screen configured with a reflective front or rear projection screen and amplified light source to display video of life size human images from the amplified light source in a 'peppers ghost' arrangement;
   wherein the life size human image generated by the amplified light source is filmed using filming studio including a black, blue, or green back screen under an LED lighting arrangement having one of more first lights for illuminating a front of the subject, wherein the first lights have a drop-off distance such that the majority of light emitted by the first lights is not reflected by the back screen back to the subject or are angled such that the majority of light emitted by the first lights is not reflected by the back screen back to the subject, and one or more second lights for illuminating the rear and/or side of the subject and operable to sharpen the outline of the subject, and one or more third lights for illuminating the feet of the subject, wherein a camera used to film the subject is stationary, the subject is a moving subject, and wherein the lighting arrangement is arranged to illuminate undersides of the subject's feet so that the base of the subject's feet are captured and displayed on the projected film.

\* \* \* \* \*